United States Patent [19]
Sato et al.

[11] Patent Number: 5,353,034
[45] Date of Patent: Oct. 4, 1994

[54] POSITION INFORMATION INPUTTING APPARATUS FOR A VEHICLE TRAVEL GUIDE SYSTEM

[75] Inventors: Naoto Sato; Toshiyuki Teshigawara, both of Maebashi, Japan

[73] Assignee: Sanden Corporation, Isesaki, Japan

[21] Appl. No.: 22,462

[22] Filed: Feb. 25, 1993

Related U.S. Application Data

[63] Continuation-in-part of Ser. No. 789,831, Nov. 8, 1991.

[30] Foreign Application Priority Data

Feb. 25, 1992 [JP] Japan ............................. 4-008358[U]

[51] Int. Cl.⁵ .............................................. G01S 3/02
[52] U.S. Cl. .................... 342/457; 364/449; 340/988; 340/995
[58] Field of Search .................. 342/457; 364/449; 340/988, 995

[56] References Cited

U.S. PATENT DOCUMENTS

| | | | |
|---|---|---|---|
| 4,897,792 | 1/1990 | Hosoi | 364/449 |
| 4,924,402 | 5/1990 | Ando et al. | 364/449 |
| 4,954,959 | 9/1990 | Moroto et al. | 364/449 |
| 4,992,947 | 2/1991 | Nimura et al. | 364/444 |

FOREIGN PATENT DOCUMENTS 60-196616 10/1985 Japan .
63-11987 1/1988 Japan .
1-48965 10/1989 Japan .

*Primary Examiner*—Theodore M. Blum
*Attorney, Agent, or Firm*—Banner, Birch, McKie & Beckett

[57] ABSTRACT

An apparatus is provided for allowing simple entry and display of location information in a vehicle travel guide system. Spot information corresponding to contents carried on an atlas is stored in a memory card 24, and by designating a retrieval condition such as an atlas name corresponding to an atlas, a page, an area or an attribute of a spot, spot information which satisfies the retrieving condition is retrieved from the spot information stored in the memory card 24 and a result of the retrieval is displayed on a display unit 23 in a superimposed relationship with an over wide image of the atlas. Further, desired spot information as the result of the retrieval is selected, and the selected spot information is stored as position information of a current location or a destination into a position information memory 12. The disclosed apparatus allows a beginner who is not familiar with the operation of the device to input position information such as a destination readily in a short time without confusion.

10 Claims, 21 Drawing Sheets

FIG. 4

| ATLAS NAME MNO | GUMMA | | | |
|---|---|---|---|---|
| UNIT LENGTH a | 2.5 KM | | | |
| SMALL DIV. LENGTH b | 500 M | | | |
| LARGE AREA NO. i | AREA REFERENCE POINT Q | | OVER WIDE PAGE NO. P | ATLAS NAME M N |
| | NORTH LATITUDE ni | EAST LONGITUDE ei | | |
| 1 | 44°00' | 144°00' | — | HOKKAIDO |
| 777 | 36°53' | 139°13' | 3 | GUMMA |
| 778 | 36°53' | 139°00' | 7 | GUMMA |
| 779 | 36°53' | 138°47' | 17 | GUMMA |
| 780 | 36°53' | 138°34' | 27 | GUMMA |
| 810 | 35°35' | 139°00' | 38 | GUMMA |
| xxxx | 33°00' | 128°00' | — | NAGASAKI |

FIG. 5

| SPOT NAME | PAGE P | AREA | NORTH LATITUDE ni | EAST LONGITUDE ei | ATTRIBUTE |
|---|---|---|---|---|---|
| MAEBASHI STATION | 46 | J3-31 | 36°01' | 139°XX' | NAME OF STATION |
| IROHA HOTEL | 46 | J3-21 | 36°XX' | 139°XX' | HOTEL |
| ABC HOTEL | 46 | H3-33 | 36°XX' | 139°XX' | HOTEL |
| 123 HOTEL | 47 | A1-55 | 36°XX' | 139°XX' | HOTEL |
| AIU CROSSING | 46 | E3-52 | 36°XX' | 139°XX' | CROSSING |

POSITION INFORMATION INPUTTING APPARATUS FOR A VEHICLE TRAVEL GUIDE SYSTEM

This application is a continuation-in-part of U.S. application Ser. No. 07/789,831, entitled "Position Recognition System and Position-Coordinate Converting Device", to Toshiyuki Teshigawara, filed Nov. 8, 1991.

TECHNICAL FIELD

This invention relates to a position information inputting apparatus for a vehicle travel guide system.

BACKGROUND OF THE INVENTION

A conventional device for determining a position which uses a Global Positioning System (G.P.S.) is well known. In such a system, a person can determine the longitude and latitude of his or her position by receiving radio signals from a plurality of satellites with a G.P.S. receiver. The person can determine his or her position by comparing a map with the longitude and latitude information from the receiver. One example of such a well known system is a commercially available LORAN navigation system.

A conventional driving guide system for a vehicle (such as a car) is known which uses a G.P.S. receiver in connection with map data stored on a CD-ROM memory media. The position from the G.P.S. receiver is compared by a computer with map data from a CD-ROM, and the position is indicated on a display together with the map data from the CD-ROM. Accordingly, one's position can be easily recognized on a display. An example of such a system is the commercially available Bosch travelpilot. One problem with such a system is that it is necessary to use an expensive memory media (e.g., CD-ROM) which can store a large quantity of map information.

U.S. application Ser. No. 07/789,831, entitled "Position Recognition System and Position-Coordinate Converting Device", fried Nov. 8, 1991, incorporated herein by reference, discloses an apparatus for inexpensively displaying positional information to a user comprising a position-coordinate converting device including position detecting means, map information storage means, and coordinate operation means for operating on area information based on the results of the position detecting means and the map information stored in the map information storage means. The disclosed apparatus allows the user to make use or a conventional paper map which is divided into square areas, each of which may be further subdivided into smaller units. The disclosed apparatus displays to the user his or her position in relation to the paper map using a much more limited map database which can, for example, be stored on a "smart card" integrated circuit device which is much smaller and cheaper than a CD-ROM storage device.

Using the previously disclosed apparatus, the user is provided with positional information in relation to data which can be viewed on a conventional paper map without the need to store an entire copy of the paper map in the apparatus itself. For example, a display may be presented to the user which indicates the page number corresponding to a paper map square area and, further, more detailed coordinates within a square area such as (A. 1-1.2),(B.2-1.2) based on the user's current position. This method provides a very inexpensive way of allowing the user to find his or her location on a paper map without the need to store a large quantity of map data on a CD-ROM, yet still supplies information to the user in a form which is more efficient than a mere latitude/longitude location, which would require that the user translate this into a paper map location. With the construction described above, the user can recognize the position of the vehicle readily by comparing area information displayed on the vehicle travel guide apparatus with the paper map. Further, position information of a destination or the like can be input readily to the vehicle travel guide apparatus.

The applicant of the present invention has proposed a vehicle travel guide system and a vehicle travel guide apparatus in Japanese Patent Application No. 2-303404 and a position information inputting apparatus for a vehicle travel guide system in Japanese Utility Model Application No. 3-373.

The vehicle travel guide system disclosed in Japanese Patent Application No. 2-303404 comprises a paper map and a vehicle travel guide apparatus, the paper map being divided into a plurality of areas each having corresponding area information, the vehicle travel guide apparatus including position information inputting means for inputting position information of at least one destination, position information storage means for storing the position information therein, position detecting means for detecting the position of a vehicle, map information storage means for storing therein information of the plurality of areas of the paper map as map information, calculating means for producing area information of the map corresponding to the position of the vehicle and travel guide information from a result of the detection of the position detecting means and the map information stored in the map information storage means, and display means for displaying a result of the calculation of the calculating means. The position and a travel route of the vehicle may be recognized by the user's comparing the result of the calculation displayed on the vehicle travel guide apparatus with the area of the paper map.

The position information inputting apparatus for a vehicle travel guide system disclosed in Japanese Utility Model Application No. 3-373 is an apparatus adapted to be placed on a paper map which is divided into a plurality of areas of a same rectangular shape and having corresponding area information for each area. The apparatus, which allows a user to input position information of a designated spot in one of the areas into the vehicle travel guide apparatus, comprises a flat plate-shaped body having a window of a shape corresponding to one of the areas and having a shape a little greater than one of the areas, area selecting means for selecting one of the plurality of areas, designated area detecting means for dividing the inside of the plane of the window into a plurality of small division areas and for detecting that one of the small division areas is designated by a finger or the like, information storage means for storing therein area information corresponding to each of the areas and small division area information corresponding to each of the small division areas, and information sending means for sending out the area information of the selected area and the small division area information of the designated small division area to the vehicle travel guide apparatus in accordance with a result of the detection of the designated area detecting means and the information stored in the information storage means. This provides a means of inputting position information of a destination or the like into the vehicle travel guide apparatus by placing the information inputting apparatus on the paper map.

With the disclosed apparatus, however, there remains a problem that the input means and display means may be inadequate for the user. For example, a beginner using the system for the first time may require a substantial amount of time to learn how to use the system. Moreover, the displayed information may be insufficient to allow the user to easily navigate with reference to a paper map. The user may not be able to efficiently enter one or more destinations into the apparatus for subsequent computation and display.

SUMMARY OF THE INVENTION

Accordingly, it is an object of the present invention to provide a position information inputting apparatus for a vehicle travel guide system into which the user can easily and efficiently input information and be provided with a more useful display of location information than has been previously possible.

In order to attain the object described above, the present invention proposes a position information input apparatus for a vehicle travel guide system which includes position detecting means for detecting the position of a vehicle, position information inputting means for inputting position information of at least one destination, position information storage means for storing the position information therein, map information storage means for storing map data of a travel road of the vehicle therein, calculating means for calculating travel guide information resulting from detection of the position detecting means, position information of the destination input to the position inputting means, and data stored in the map information storage means; and display means for displaying a result of the calculation of the calculating means. The apparatus also includes spot information storage means for storing therein spot information corresponding to contents carried on a paper map, spot information retrieving means for designating a predetermined retrieval condition corresponding to the paper map and for retrieving spot information satisfying the retrieval condition from the spot information stored in the spot information storage means, and position information selecting input means for causing display of a result of the retrieval by the spot information retrieving means and for selectively storing desired spot information resulting from the retrieval into the position information storage means.

Further, the present invention provides a position information inputting apparatus for a vehicle travel guide system, wherein the spot information storage means comprises an IC memory card which is removable from a body of the apparatus.

Further, the present invention provides a position information inputting apparatus for a vehicle travel guide system wherein the display means displays thereon an "over wide" image of the paper map and further displays the result of the retrieval or the input spot in a superimposed relationship with the image.

Spot information corresponding to the contents carried on the paper map such as, for example, the names, the longitude and latitude information and so forth of crossings or stations corresponding to pages of the paper map is stored by the spot information storage means, Further, by designating a predetermined retrieval condition corresponding to the paper map such as, for example, a page number of the paper map or an attribute such as a crossing or a station, spot information satisfying the retrieval condition is retrieved by the spot information retrieving means from the spot information stored in the spot information storage means. Further, a result of the retrieval by the spot information retrieving means is displayed on the display means and desired spot information of the result of the retrieval is selectively stored into the position information storage means by the position information selecting inputting means. In other words, only the designated result of the retrieval displayed on the display means is stored into the position information storage means.

BRIEF DESCRIPTION OF THE DRAWINGS

FIG. 4 is a view illustrating an example of map information stored in a map information memory in accordance with the principles of the present invention.

FIG. 5 is a view illustrating an example of spot information stored in a memory card in accordance with the principles of the present invention.

DETAILED DESCRIPTION OF THE DRAWINGS

In the present invention, a paper map such as an atlas (provided, for example, for each of a number of urban and rural prefectures) is used to input position information of a current location and a plurality of destinations from the atlas into a vehicle travel guide apparatus as described below.

Figure 1:
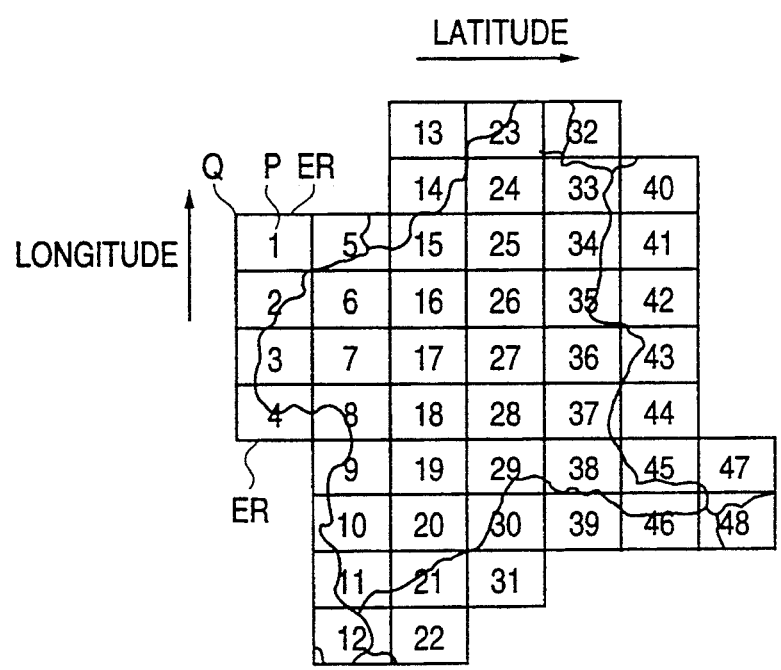
FIG. 1 is a view showing the construction of an atlas employed in one embodiment of the present invention.
Figure 2A:
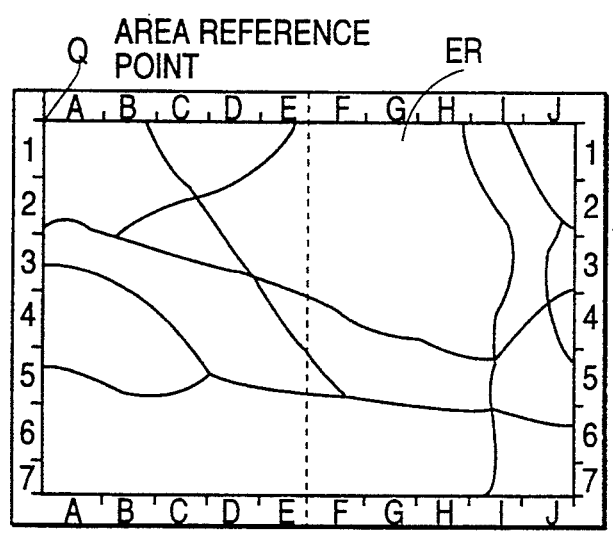
FIG. 2 is a view showing the construction of one area ER contained within the atlas employed in one embodiment of the present invention.
Figure 2B:
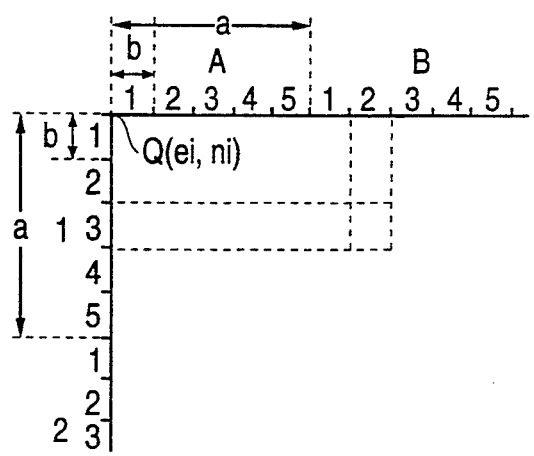

The atlas is divided, as shown in FIGS. 1 and 2, into a plurality of large areas ER having a grating in longitude and latitude, which do not overlap with each other and to which page. numbers P are assigned. The atlas is printed in an "over wide" condition for each of the large areas, and to each large area ER, coordinates of A, B, C, etc. are allotted along a latitude line while coordinates of 1, 2, 3, etc. are allotted along a longitude line for each unit length B (for example, for each 5 km in the case of a scale of 1 to 100,000) in the longitude direction and the latitude direction, respectively as shown in FIG. 2. Consequently, each large area ER is divided into small areas represented by coordinates such as (A-1) or (B-1). The atlas may have a size a little greater than A4 paper size, and in the atlas, the large areas ER may be, for example, represented by a size of 35 cm long and 50 cm wide while the small areas may be represented in the size of 5 cm long and 5 cm wide. Further, each of the small areas may be divided into a plurality of smaller division areas as shown in FIG. 2(b).

Individual atlas names MN, division lengths a in the longitude and latitude directions of the large and small areas indicated in the individual atlases, division lengths b in the longitude and latitude directions of the small division areas and page numbers P and coordinates of area reference points Q at the upper left corners of the individual large areas ER are stored in advance in the vehicle travel guide apparatus as hereinafter described.

Figure 3:
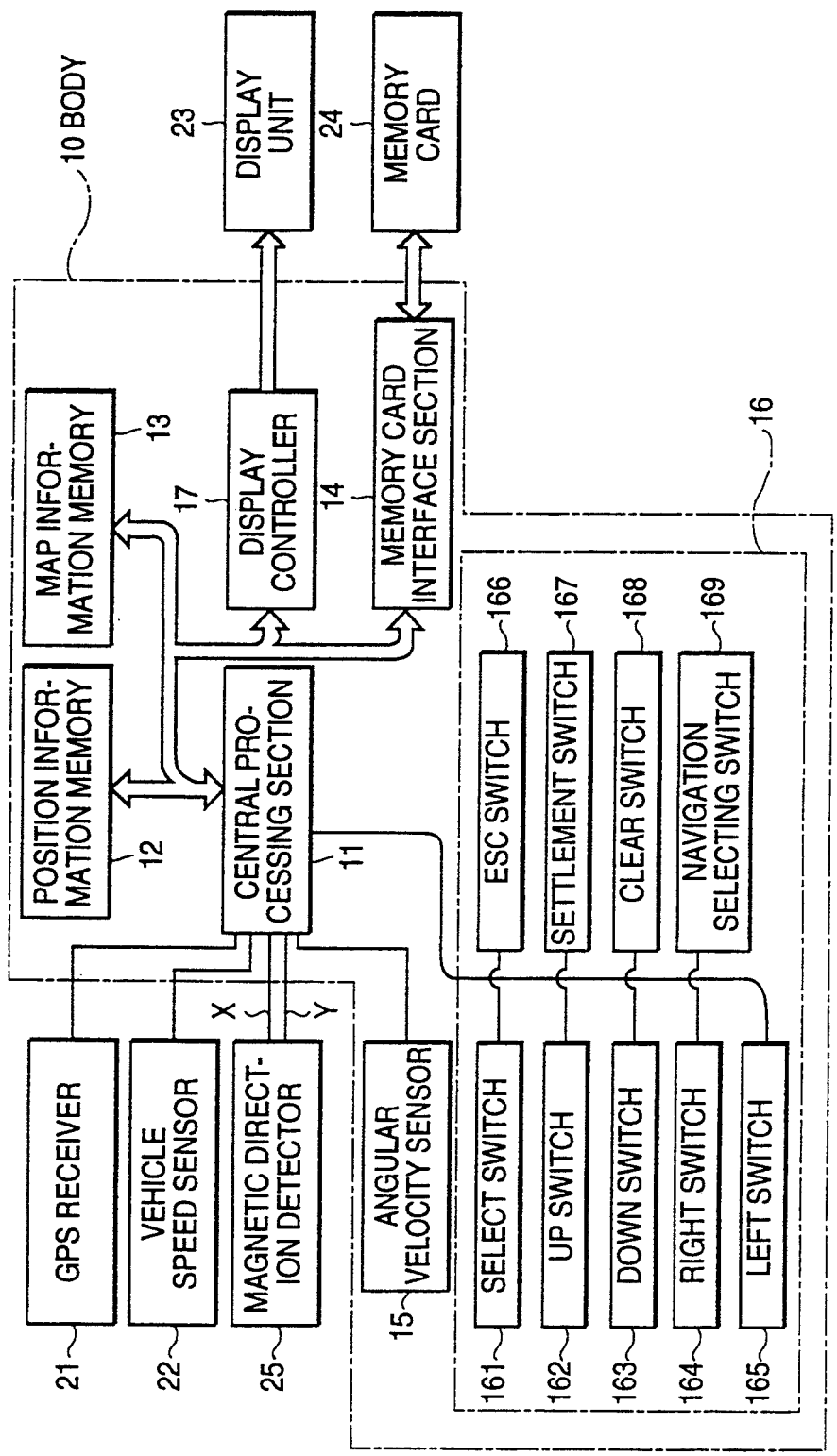
FIG. 3 is a block diagram of a vehicle travel guide apparatus in accordance with the principles of the present invention.

FIG. 3 is a block diagram of a vehicle travel guide apparatus in one embodiment of the present invention. Referring to FIG. 3, reference numeral 10 denotes a vehicle travel guide apparatus body (hereinafter referred to as body), which has, though not shown, a box-shaped profile and may be disposed on a console or the like of a vehicle in the proximity of a driver's seat.

Reference numeral 21 denotes a well-known GPS receiver, which is formed in a portable small shape. Further, it may include a built-in battery and a liquid crystal display unit and can be carded and used by itself when a portable antenna is connected to it. GPS receiver 21 is normally disposed, except an external antenna (not shown), in the trunk of the vehicle, receives radio waves from a plurality of satellites, and outputs the position of the vehicle in the form of data containing a longitude and a latitude to a central processing section 11. Reference numeral 22 denotes a vehicle speed sensor, which outputs a pulse signal corresponding to a speed of rotation of a wheel to central processing section 11. Reference numeral 23 denotes a display unit, 24 a memory card, and 25 a magnetic direction detector.

Body 10 includes a central processing section 11 formed from a CPU and so forth, a position information memory 12, a map information memory 13, a memory card interface section 14, an angular velocity sensor 15, a switch section 16 and a display controller 17.

Position information memory 12 may be constructed from a RAM backed up by means of a battery and is connected to the central processing section 11 so that position information of a starting point and a destination which are input by way of the switches of switch section 16 are stored into position information memory 12.

Map information memory 13 may be constructed from a ROM connected to central processing section 11, and as shown in FIG. 4, stores atlas information, including coordinates of the area reference points Q at the upper left corners of the large areas ER in the column labelled Area Reference Point Q. When an entire territory (such as Japan) is divided into large areas ER, names of atlases in which the large areas ER are included are stored in map information memory 13 while the atlas name, the unit length a described above, the over wide page numbers P of the atlas corresponding to the plurality of large areas ER included in a relevant one of the urban and rural prefectures and so forth are also stored in map information memory 13. The large area number is allotted in order of the latitude beginning with that large area ER which is greatest in latitude of coordinates of the area reference point Q, and when two or more large areas ER are present which are equal in latitude of coordinates of the reference point Q to each other, the large area number is allotted in order of the longitude beginning with that one of the large areas ER which is greatest in longitude of coordinates of the area reference point Q.

Memory card interface section 14 includes a connector for fitting with a memory card 24 and disconnectably interconnects memory card 24 and central processing section 11.

Angular velocity sensor 15 (constructed from, for example, from a gyro) detects an angular velocity $\omega$ applied to the vehicle and outputs the value in the form of digital data to central processing section 11.

Switch section 16 may be constructed from a select switch 161, an UP switch 162, a DOWN switch 163, a RIGHT switch 164, a LEFT switch 165, an ESC switch 166, a settlement switch 167, and a clear switch 168 which are each formed from a momentary switch, and a navigation selecting switch 169 formed from an alternate switch, each switch being connected to central processing section 11. Further, a lamp may be built in navigation selecting switch 169 which is lit in response to a signal from central processing section 11.

Memory card 24 may be constructed from a nonvolatile memory such as ROM, and data of predetermined spots carded on the atlas such as, for example, names, coordinates, carrying pages, attributes and so forth of particular locations such as gas stations, crossings, hotels and spas may be stored as atlas information (a priori) in the memory card 24 as seen in FIG. 5. In other words, an atlas is provided corresponding to each of the urban and rural prefectures, and a memory card 24 in which spot information is stored is provided for each of the atlases.

Magnetic direction detector 25 may be constructed, for example, from first and second terrestrial magnetism sensors; output signals are input to central processing section 11. The first and second terrestrial magnetism sensors may be each constructed from, for example, a wellknown flux gate type terrestrial magnetism sensor, and are disposed such that they extend perpendicularly to each other so that the first terrestrial magnetism sensor detects a component of terrestrial magnetism in the advancing direction of the vehicle while the second terrestrial magnetism sensor detects another component of the terrestrial magnetism in a lateral direction of the vehicle. Consequently, the first and second terrestrial magnetism sensors output sine wave signals X and Y which are displaced by 90 degrees in phase from each other, and the signal X presents a positive voltage when the direction of the terrestrial magnetism is directed from the right side to the left side of the vehicle while the signal Y presents a positive voltage when the direction of the terrestrial magnetism is directed from the rear to the front of the vehicle. The direction can be judged by detecting the phases of the signals X and Y.

Display unit 23 may be constructed of any suitable display such as a liquid crystal display which is capable of displaying both alphanumeric characters and simple graphics symbols as shown herein with reference to FIGS. 6–10.

Operation of the vehicle travel guide apparatus having the construction described above will now be described with reference to the display examples of FIGS. 6–10 and the control flow charts of FIGS. 11–24.

Figure 6:
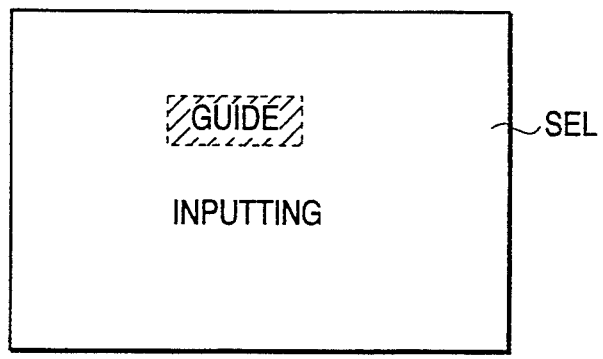
FIG. 6 is a view showing an information inputting screen in accordance with the principles of the present invention.

When the present vehicle travel guide apparatus is used for a journey by car, position information of a current location or a starting location and one or more destinations may be input in advance by operation of the switches of switch panel 16. The position information is input in the form of an atlas name, an over wide page number P, and a latitude coordinate and a longitude coordinate or longitude and latitude data described hereinabove. When the apparatus is started, a menu screen S1 for inputting data and for selection of a display is displayed on display unit 23 as shown in FIG. 6. In this instance, since the item "GUIDE" is displayed in inverse video, the item "INPUTTING" may be caused to be displayed in inverse video by way of UP switch 162 or the DOWN switch 163, and then by pressing settlement switch 167.

Figure 7:
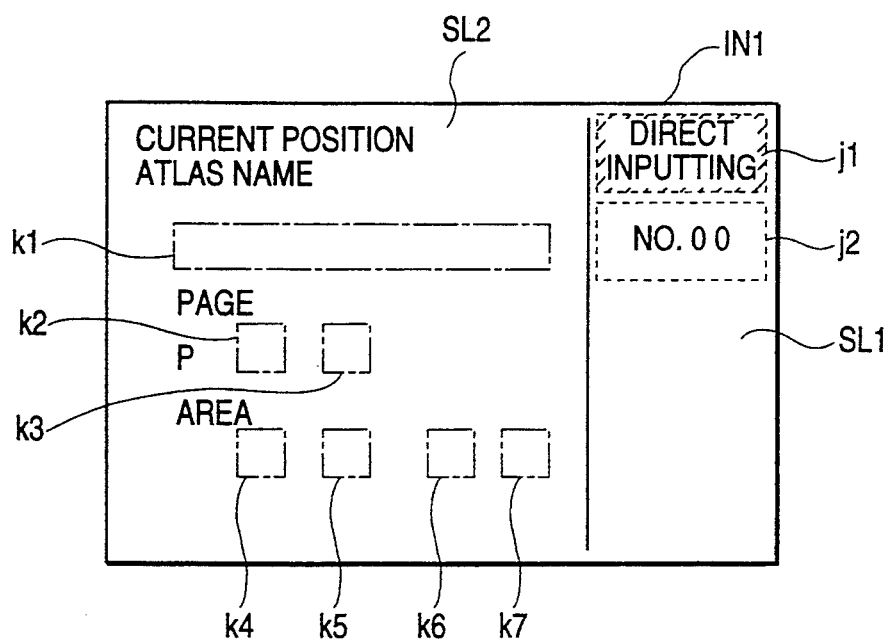
FIG. 7 is a view showing another information inputting screen in accordance with the principles of the present invention.

Consequently, selecting "INPUTTING" will Coy way of LIP or DOWN switch 162 or 163 followed by settlement switch 167) cause screen IN1 for direct inputting to be displayed as shown in FIG. 7. In the direct inputting screen IN1, selection items of an input mode j1 and a spot number j2 are displayed in a first selection region SL1 on the right side in the screen, and the label "DIRECT INPUTTING" is displayed with inverse video at input mode j1 while the label "No. 00" is displayed at spot number j2. Position information of a current position or a starting position may be input to the "No. 00" at spot number j2, and position information of a destination may be entered into any other spot number.

For a given object spot j2, the following information may be displayed in a second selection region SL2 on the left side of the screen: an atlas name k1 (example: Gurnma), a first figure k2 of an over wide page number, a second figure k3 of an over wide page number, a latitude coordinate k4, an auxiliary coordinate k5 for the latitude coordinate, a longitude coordinate k6 and an auxiliary coordinate k7 for the longitude coordinate. An example entry for the area would be J3-31 as indicated in the first row of the table in FIG. 5. In order to select an input object, either the UP key 162 or the DOWN key 163 is depressed, but when contents or a numeral of an object being input is to be changed, if either the RIGHT key 164 or the LEFT key 165 is depressed then the contents of, or a numeral of, a next candidate is displayed. Contents of the display of each item are set in advance by a program in central processing section 11 described in more detail herein.

When position information is to be input with the direct input screen IN1, spot number j2 is displayed in inverse video by pressing the UP or DOWN key 162 or 163, and then if RIGHT or LEFT key 164 or 165 is depressed, the destination number changes in an endless fashion between, for example, 00 and 20 so that position information of a current location or a destination can be input corresponding to the number. If select switch 161 is depressed thereafter, then the cursor of the display representing the object to be input moves to second selection region SL2, and the atlas name k1 is displayed in inverse video to allow inputting of position information. If select switch 161 is depressed again, then the cursor moves to the first selection region SL1. Position information input by the user is stored into position information memory 12 when the cursor is moved to the first selection region SL1 or when the settlement switch 167 is depressed. Further, it is possible to cause the menu screen SEL described hereinabove to be displayed by depression of ESC switch 166.

On the other hand, when direct inputting described above is cumbersome, selective input by way of an image or a list can be performed. If the cursor is moved to the item of the input mode j1 and the RIGHT or LEFT key 164 or 165 is depressed, then the label "IMAGE INPUTTING" or "LIST INPUTTING" are displayed in place of "DIRECT INPUTTING" in area j1 as seen in FIGS. 8 and 9, respectively.

Figure 8:
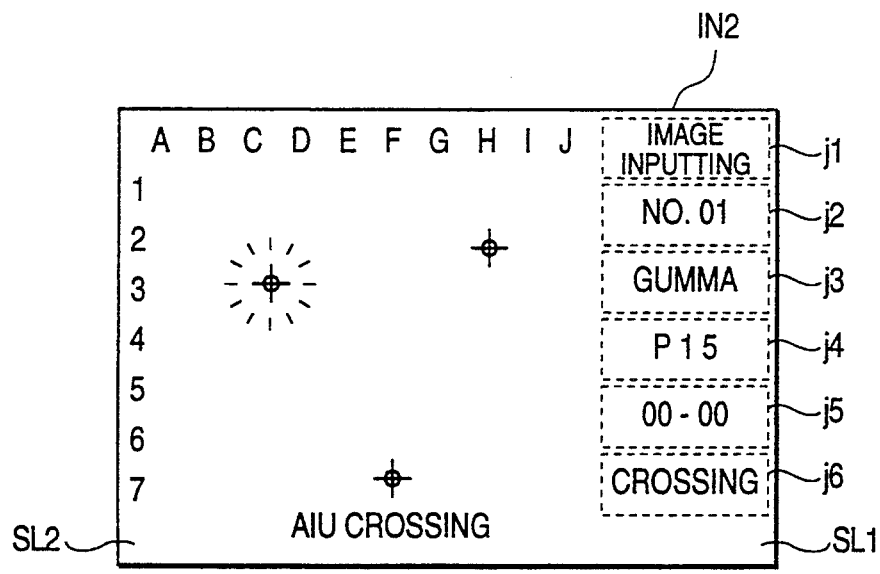
FIG. 8 is a view showing a further information inputting screen in accordance with the principles of the present invention.
Figure 9:
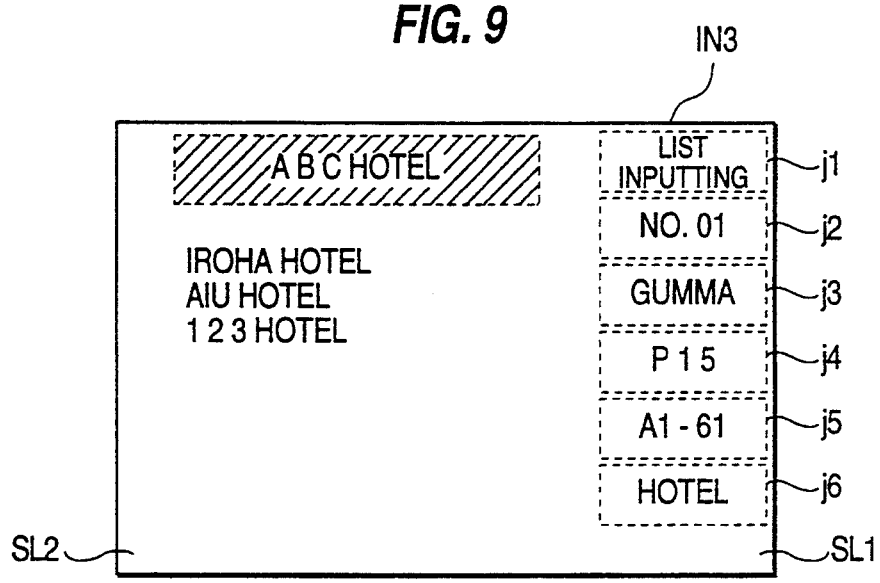
FIG. 9 is a view showing a further information inputting screen in accordance with the principles of the present invention.

When "IMAGE INPUTTING" is displayed as the input mode in j1, the screen display is changed over to image inputting screen IN2 as shown in FIG. 8. In image inputting screen IN2, the selection items of an input mode j1, a spot number j2, an atlas name j3, an over wide page number j4 of the atlas, an area j5, an attribute j6 of a particular location and so forth are displayed in the first selection region SL1 as shown in FIG. 8. In order to select any of these items, the UP key 162 or the DOWN key 163 is depressed. When contents of, or a numeral of, any selection item is to be changed, pressing RIGHT key 164 or LEFT key 165 will cause the contents of, or a numeral of, a next candidate to be displayed. Display contents of each item are set in advance by a program of central processing section 11 as described in more detail herein.

When setting of each item is performed, particular locations stored in spot information memory 24 which are present in the relevant area and selected in accordance with attribute j6 are displayed in the second selection region SL2 corresponding to an image of a map as shown in FIG. 8. In particular, coordinates of the atlas are displayed at an upper portion and a left portion of second selection region SL2, and the positions of the particular locations are displayed at positions corresponding to the coordinates as depicted in FIG. 8. If select switch 161 is depressed, then the cursor moves to second selection region SL2 and one of the particular locations is displayed blinking while the name of the particular location is also displayed. The blinking displayed particular location becomes an object for inputting, and when position information of the particular location is to be stored, the settlement switch 167 is depressed. When some other particular location is to be selected, pressing UP key 162 or DOWN key: 163 will cause the location of a next candidate to be displayed blinking.

In order to effect transition from the image inputting screen IN2 to direct input screen IN1 or list inputting screen IN3, the cursor may be moved to the item of input mode j1 to effect the change over. Further, if the ESC switch 166 is depressed, menu screen SEL described above can be displayed.

When the label "LIST INPUTTING" is displayed in input mode j 1, the screen display is changed over to that of screen IN3 shown in FIG. 9. The selection items are similar to those described above, and include input mode j1, spot number j2, atlas name j3, over wide page number j4 of the atlas, area j5, and attribute j6 of a particular location and so forth displayed in selection region SL1. In order to select any of these items, UP key 162 or DOWN key 163 may be pressed. When the contents or a numeral of any selection item is to be changed, pressing RIGHT key 164 or LEFT key 165 will cause the contents of or a numeral of a next candidate to be displayed. Contents of display of each item are set in advance in the program of central processing section 11 as described herein.

When setting of each item is performed, the names of particular locations stored in spot information memory 24 which are present in the relevant area and selected in accordance with the attribute j6 are displayed as a list in region SL2 as shown in FIG. 9. If select switch 161 is pressed, the cursor will move to the second selection region SL2 and one of the particular locations is displayed as blinking. The blinking displayed particular location becomes the selected object for inputting, and when position information is to be input, settlement switch 167 will effect storage into memory. If UP key 162 or DOWN key 163 is pressed, the name of another particular location of a next candidate will be displayed as blinking. In order to effect transition from the list inputting screen IN3 to the direct inputting screen IN1 or the image inputting screen IN2, the cursor can be moved to the item of input method j1 to effect the changing over. Further, if the ESC switch 166 is depressed, menu screen SEL described above will be displayed.

Further, in any of the inputting screens, when it is desired to change or delete position information, either only the portion to be changed is modified or the clear switch 168 is depressed to delete position information of the current location or the destination which makes an object for inputting, whereafter the settlement switch 167 may be depressed.

While the vehicle is travelling and when dead reckoning navigation is performed without using the GPS receiver, or when the GPS receiver is used together with dead reckoning navigation, the navigation selecting switch 169 should be turned on at the currently input location described above.

Upon starting of travel or midway through travel, "GUIDE" should be selected with menu screen SEL as shown in FIG. 6. Consequently, guide screen DSP shown in FIG. 10 will be displayed. In guide screen DSP, selection items of an atlas name ml, an over wide page number m2 of the atlas, an area m3, an attribute m4 of a particular location, a destination number m5 and a current location m6 are displayed in first selection region SL1, but the portion of the display other than region SL1 serves as a position display region DP. Coordinates of the atlas are displayed at an upper portion and a left portion of the position display region DP, and a current location, destinations, particular locations and so forth are displayed at positions corresponding to the coordinates on display region DP.

In order to select any one of the items displayed, similarly as described hereinabove, UP key 162 or DOWN key 163 may be depressed. When contents or a numeral of any selection item is to be changed, depressing RIGHT key 164 or LEFT key 165 will cause the contents or a numeral of a next candidate to be displayed. Contents of display of each item are set in advance by a program of central processing section 11 as described in more detail herein.

At the item of area m3, an arbitrary one of areas of 0 and A1 to J7 can be selected. When 0 is selected, the entire large area ER of the page number m2 will be displayed in area DP, but when any one of A1 to J7 is selected, a smaller area corresponding to this selected area will be displayed in area DP. If contents of the attribute m4 of a particular location are changed by the user, then particular locations of the set attribute, for example, the positions of crossings or the like, are displayed in the display region DP. When selection is performed at item m5 of the destination number m5, the position of an arbitrary destination can be displayed, and if the item of current location m6 is selected and the settlement switch 167 is depressed, then whatever area is in a displayed condition, the large area ER including the current location will be displayed. Furthermore when the area including the current location is displayed, the advancing direction is displayed as a vector from a symbol indicating the current position as shown in area DP of FIG. 10.

The driver is only required to travel toward the destination in accordance with the display of display unit 23. If the travel route to the destination is lost, the driver can recognize the current position of the vehicle and the travel route to the destination by looking at the atlas in accordance with coordinates of the map displayed on display unit 23. When the driver is to leave the vehicle, if GPS receiver 21 is removed and carried by itself, then the position of the vehicle can be recognized in terms of longitude and latitude.

Details of control of central processing section 11 will now be described with reference to the control flow charts shown in FIGS. 11–24. The control may be implemented in any suitable computer language which is compiled for and executes on a microprocessor in central processing section 11 which has memory for storing executable cede and variables.

Figure 11:
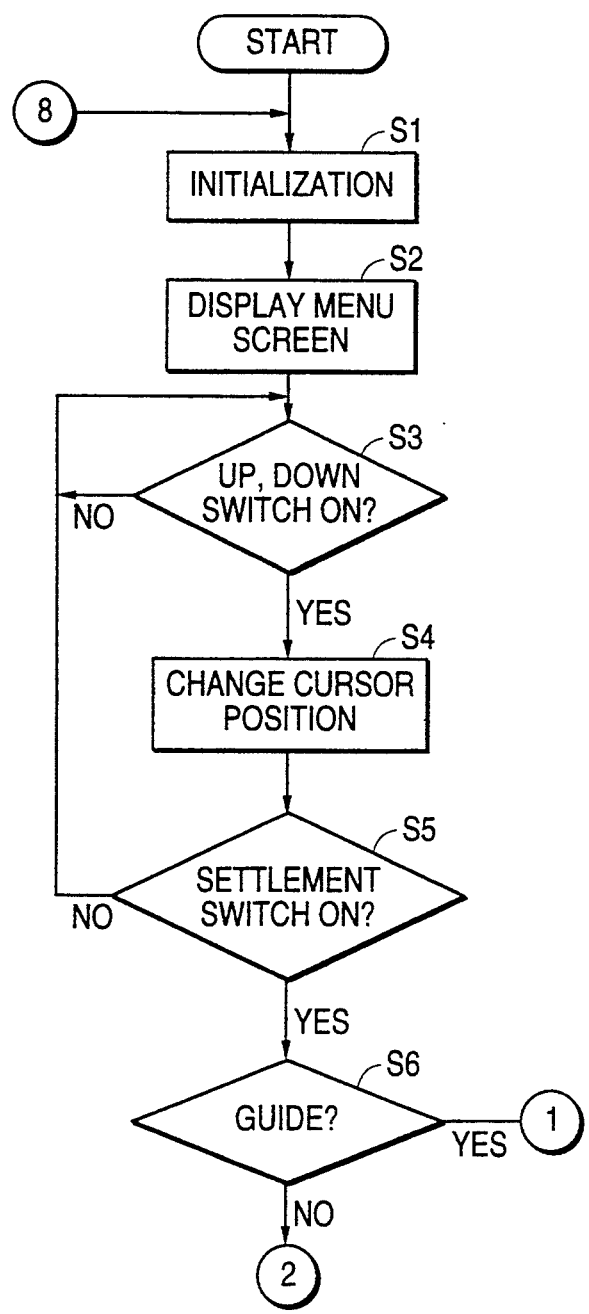
FIG. 11 is a control flow chart in accordance with the principles of the present invention.

With reference to FIG. 11, central processing section 11 sets a variable H to 0 and sets variables J, K and M to 1 as its initialization (S1) and then causes the menu screen SEL to be displayed (S2), whereafter it judges whether UP or DOWN switch 162 or 163 has been turned on (S3). If there is no change in UP or DOWN switches 162 or 163, control returns to S3. If UP or DOWN switch 162 or 163 has been turned on, central processing section 11 changes the position of the cursor of the inverse video display in response to the switch thus turned on (S4).

Thereafter, central processing section 11 judges whether settlement switch 167 has been turned on (S5), and when the settlement switch 167 has not been turned on, advances control sequence to the processing at S3 described above, but when settlement switch 167 has been turned on, it judges whether the cursor position is at item "GUIDE" (S6) as seen in FIG. 6. When the cursor position is at item "GUIDE", control advances to processing at S 136 (FIG. 23), but when the cursor position is not at item "GUIDE", central processing section 11 determines that the cursor position is at the item for inputting and causes the direct inputting screen IN1 to be displayed (ST) as depicted in FIG. 7.

Figure 12:
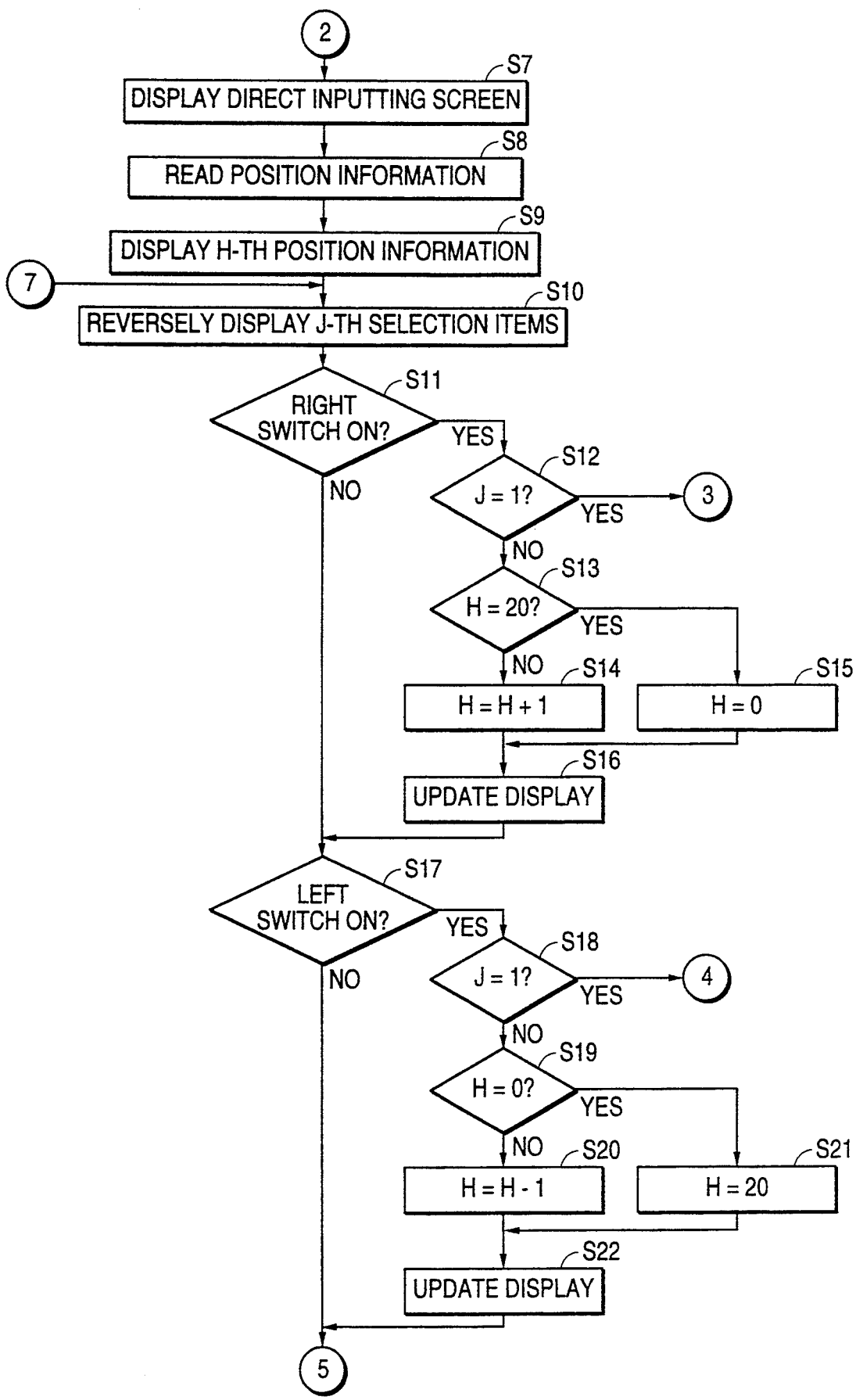
FIG. 12 is another control flow chart in accordance with the principles of the present invention.

Subsequently, as continued in FIG. 12, central processing section 11 reads out position information stored in position information memory 12 (S8) and causes the position information of the H-th current location or destination to be displayed in the second selection region SL2 (S9). Subsequently, the J-th selection items j1 and j2, which are displayed in first selection region SL1, are displayed in inverse video (S10). Thereafter, central processing section 11 judges whether RIGHT switch 164 has been turned on (St 1), and if not, control advances to processing at S 17. When RIGHT switch 164 has been turned on, central processing section 11 judges whether variable J is equal to 1 (S12). When variable J is equal to 1, control advances to processing at S54 (FIG. 15), but when variable J is not equal to 1, central processing section 11 determines that variable J is equal to 2 and judges whether variable H is equal to 20 (S13). It will be noted that the number 20 was selected as an arbitrary maximum and any other maximum number could instead be used.

If variable H is not equal to 20, central processing section 11 increments variable H by one (S14), whereafter control advances to processing at S 16. If variable H is equal to 20, central processing section 11 resets variable H to 0 (S15) and then updates the display (S16). In particular, central processing section 11 causes the numeral display at the spot number j2 to be changed to that corresponding to the variable H and causes the position information corresponding to the spot number to be displayed in the second selection region SL2.

Figure 13:
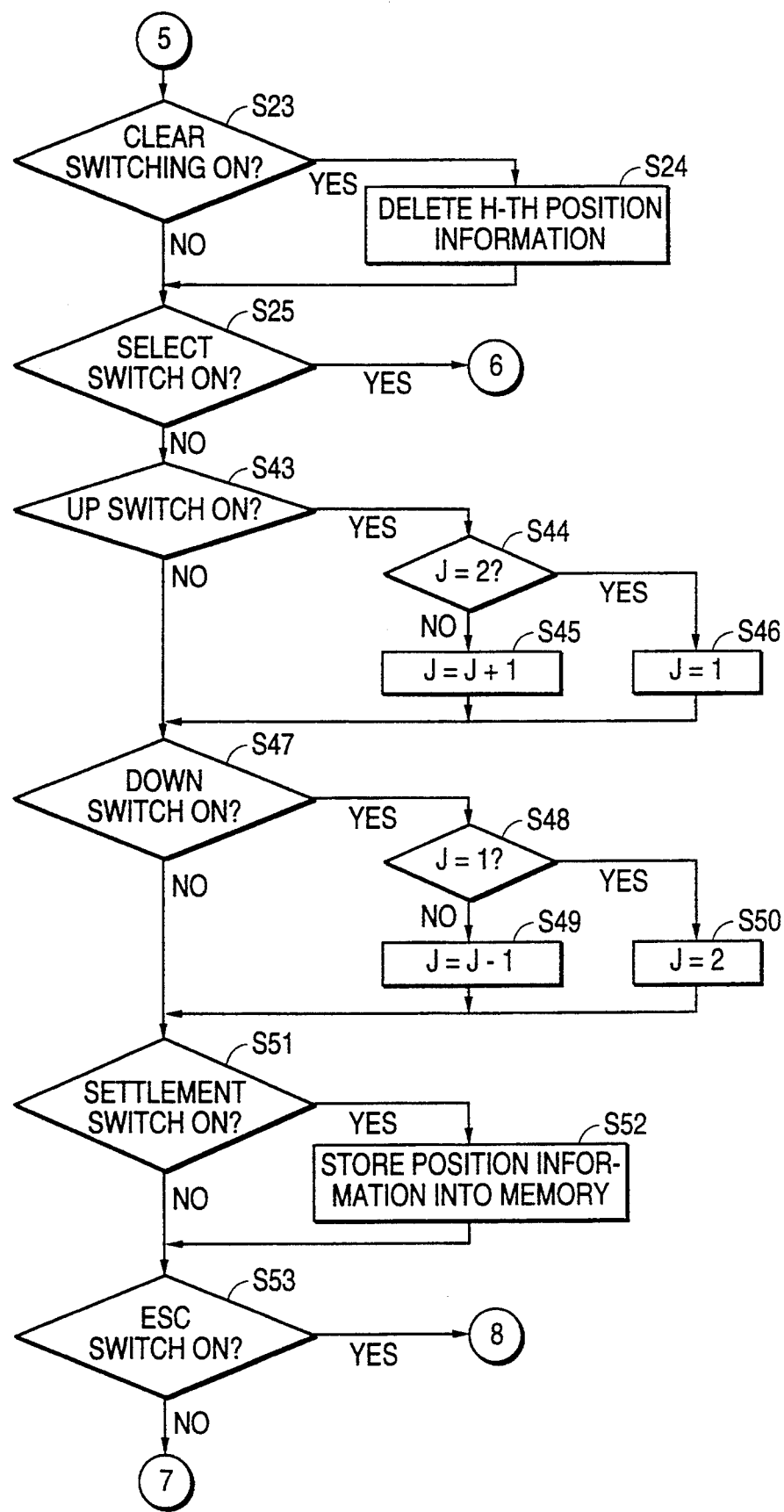
FIG. 13 is a further control flow chart in accordance with the principles of the present invention.
Figure 14:
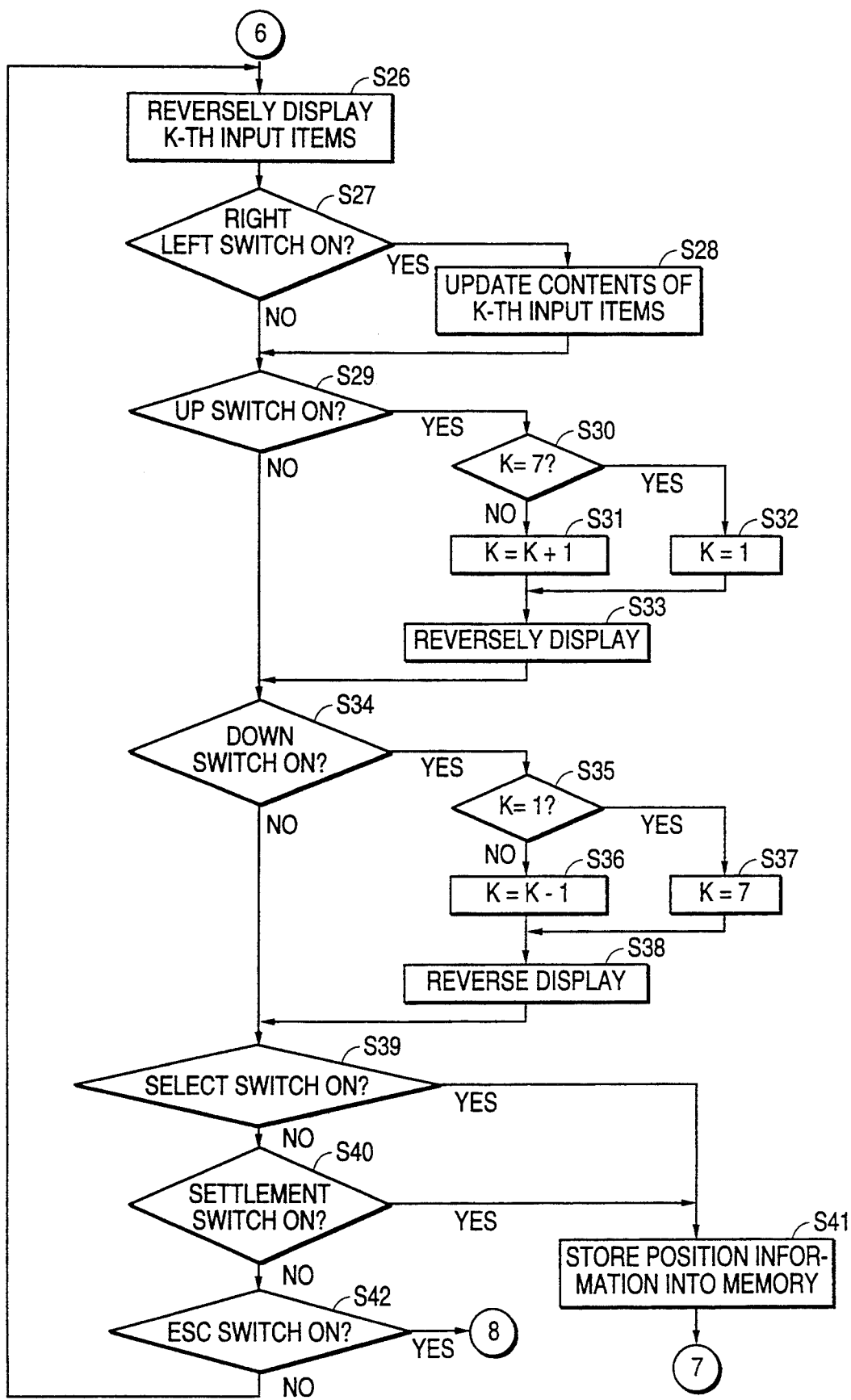
FIG. 14 is a further control flow chart in accordance with the principles of the present invention.
Figure 15:
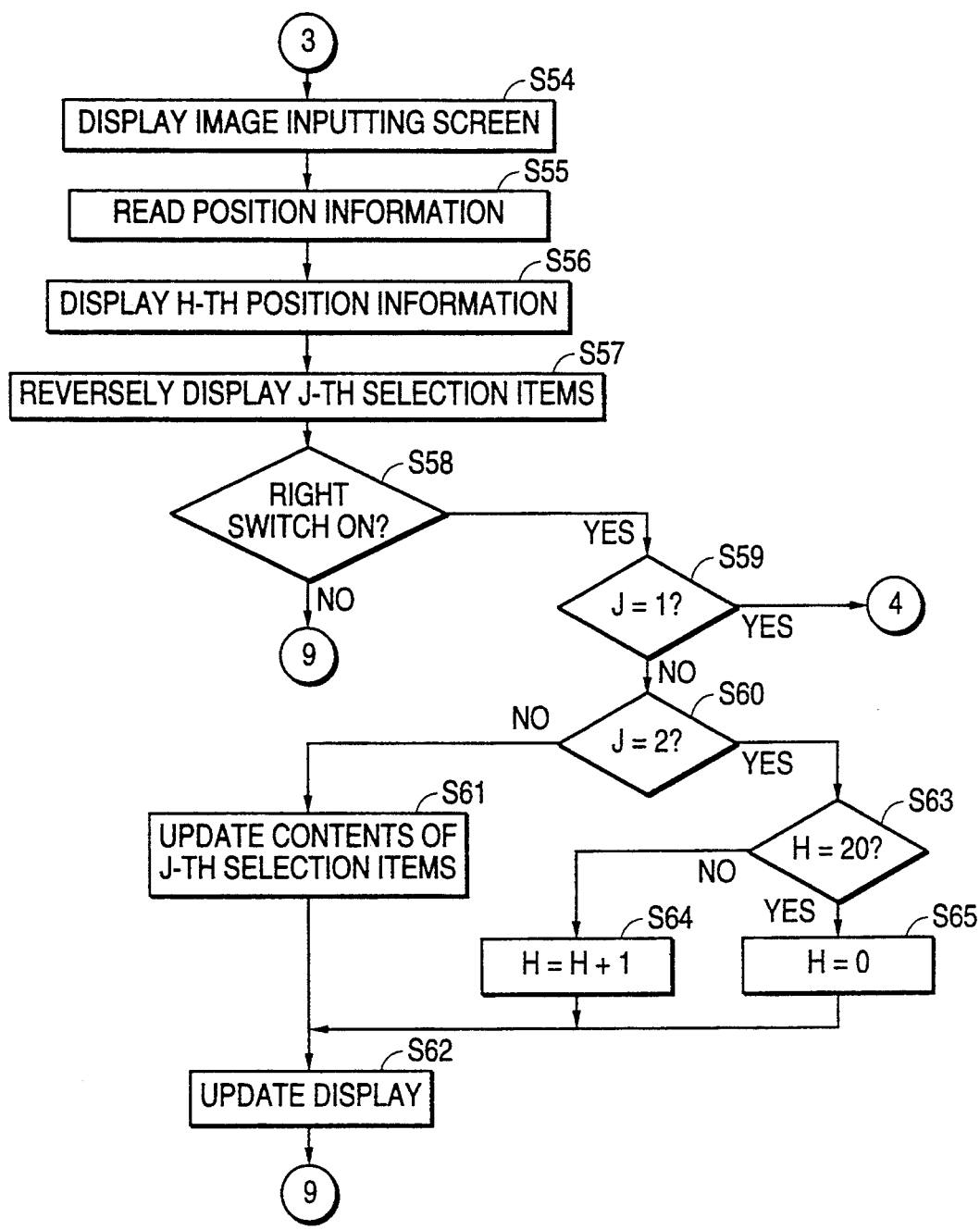
FIG. 15 is a further control flow chart in accordance with the principles of the present invention.

Subsequently, central processing section 11 judges whether LEFT switch 165 has been turned on (S17), and when LEFT switch 165 has not been turned on, control advances to S23 (FIG. 13). When LEFT switch 165 has been turned on, central processing section 11 judges whether variable J is equal to 1 (S18). If variable J is equal to 1, control advances to S95 (FIG. 19), but if variable J is not equal to 1, central processing section 11 determines that variable J is equal to 2 and judges whether variable H is equal to 0 (S19). If variable H is not equal to 0 central processing section 11 decrements variable H by 1 (S20) and advances to processing at S22, but if variable H is equal to 0, central processing section 11 sets variable H to 20 (S21) and then updates the display (S22). In particular, central processing section 11 causes the numeral display at spot number j2 to be changed to that corresponding to the variable H and causes the position information corresponding to the spot number to be displayed in the second selection region SL2.

Referring now to FIG. 13, central processing section 11 judges whether clear switch 168 has been turned on (S23), and if so, deletes the position information of the H-th current portion or destination from position information memory 12 (S24). On the other hand, if clear switch 168 has not been turned on, central processing section 11 judges whether select switch 161 has been turned on (S25), and if not, control advances to processing at S43.

If select switch 161 has been turned on, central processing section 11 causes the K-th input items k1 to k7 in the second selection region SL2 to be displayed in inverse video (S26 in FIG. 14) and then judges whether the RIGHT or LEFT switch 164 or 165 has been turned on (S27). When the RIGHT or LEFT switch 164 or 165 has been turned on, central processing section 11 updates the contents of the K-th input items k1 to k7 to those of the preceding candidate or a next candidate (S28).

Subsequently, central processing section 11 judges whether UP switch 162 has been turned on (S29), and when UP switch 162 has not been turned on, it advances the control sequence to processing at S34. When LIP switch 162 has been mined on, central processing section 11 judges whether variable K is equal to 7 (S30). When variable K has any other value than 7, central processing section 11 increments variable K by 1 (S31), but when variable K is equal to 7, it sets variable K to 1 (S32) and then causes only the K-th input items k1 to k7 to be displayed with inverse video (S33).

Central processing section 11 next judges whether DOWN switch 163 has been turned on (S34), and if not, control advances to S39. If DOWN switch 163 has been turned on, central processing section 11 judges whether variable K is equal to 1 (S35). When variable K has any other value than 1, central processing section 11 decrements variable K by 1 (S36), but when variable K is equal to 1, it sets variable K to 7 (S37) and then causes only the K-th input items k1 to k7 to be displayed with inverse video (S38).

Subsequently, central processing section 11 judges whether select switch 161 has been turned on (S39), and when select switch 161 has been turned on, it advances the control sequence to processing at S41. When select switch 161 has not been mined on, central processing section 11 judges whether settlement switch 167 has been tuned on (S40). When settlement switch 167 has been turned on, central processing section 11 stores the position information of the H-th current location or destination into the position information memory 12 (S41) and then advances the control sequence to the processing at S10 described above (FIG. 12). On the other hand, when settlement switch 167 has not been turned on, central processing section 11 judges whether ESC switch 166 has been turned on (S42), and, if so, advances the control sequence to the processing at S1 described hereinabove. If ESC switch 166 has not been turned on, central processing section 11 advances the control sequence to the processing at S26 described hereinabove.

Referring again to FIG. 13, if select switch 161 has not been mined on at S25 described above, central processing section 11 judges whether UP switch 162 has been turned on (S43), and when UP switch 162 has not been turned on, control advances to processing at S47.

When UP switch 162 has been turned on, central processing unit 11 judges whether variable J is equal to 2 (S44). When variable J has any other value than 2, central processing section 11 increments variable J by 1 (S45), but when variable J is equal to 2, it sets variable J to 1 (S46) and then judges whether DOWN switch 163 has been turned on (S47).

When DOWN switch 163 has not been turned on, central processing section 11 advances to processing at S51, but when DOWN switch 163 has been turned on, it judges whether variable J is equal to 1 (S48). When variable J has any other value than 1, central processing section 11 decrements variable J by 1 (S49), but when variable J is equal to 1, it sets variable J to 2 (S50) and then judges whether settlement switch 167 has been turned on (S51).

When settlement switch 167 has been turned on, central processing section 11 stores the position information of the H-th current location or destination into the position information memory 12 (S52). On the other hand, when settlement switch 167 has not been turned on, central processing section 11 judges whether the ESC switch 166 has been turned on (S53).

When ESC switch 166 has been turned on, central processing section 11 advances to processing at S1 (FIG. 11) described hereinabove, but when the ESC switch 166 has not been turned on, it advances to processing at S 10 described hereinabove.

Referring again to FIG. 12, when variable J is equal to 1 at S12 described above, central processing section 11 causes the image inputting screen IN2 to be displayed (S54, FIG. 15) and then reads out data of the position information memory 12 (S55), whereafter it causes the position information of the H-th current location or destination to be displayed in the second selection region SL2 (S56). Subsequently, central processing section 11 causes the J-th selection items j1 to j6, which are displayed in the first selection region SL1, to be displayed with inverse video (S57). Thereafter, central processing section 11 judges whether RIGHT switch 164 has been turned on (S58), and if not, advances the control sequence to processing at S66 as shown in FIG. 16.

When RIGHT switch 164 has been turned on, central processing section 11 judges whether variable J is equal to 1 (S59). When the variable J is equal to 1, central processing section 11 advances to processing at S95 (FIG. 19), but otherwise judges whether variable J is equal to 2 (S60). When variable J has any other value than 2, central processing section 11 updates the contents of the J-th selection item j 1 to j6 displayed in first selection region SL1 to those of a preceding candidate (S61) and then updates the display (S62), whereafter it advances the control sequence to processing at S66 (FIG. 16). In particular, central processing section 11 causes the numeral display at spot number j2 to be changed to that corresponding to the variable H and causes the positions of particular locations stored in spot information memory 24 which have the attribute selected at the item of the attribute j6 of a particular location and are included in the area j5 carded on the over wide page number j4 of the atlas of the atlas name j3, to be displayed in the form of symbols in the second selection region SL2.

On the other hand, when variable J is equal to 2 as a result of the judgment at S60, central processing section 11 judges whether variable H is equal to 20 (S63). When variable H is not equal to 20 central processing section 11 increments variable H by 1 (S64) and then advances the control sequence to the processing at S62 described above, but when variable H is equal to 20, it sets variable H to 0 (S65) and then advances the control sequence to the processing at S62 described above.

Figure 16:
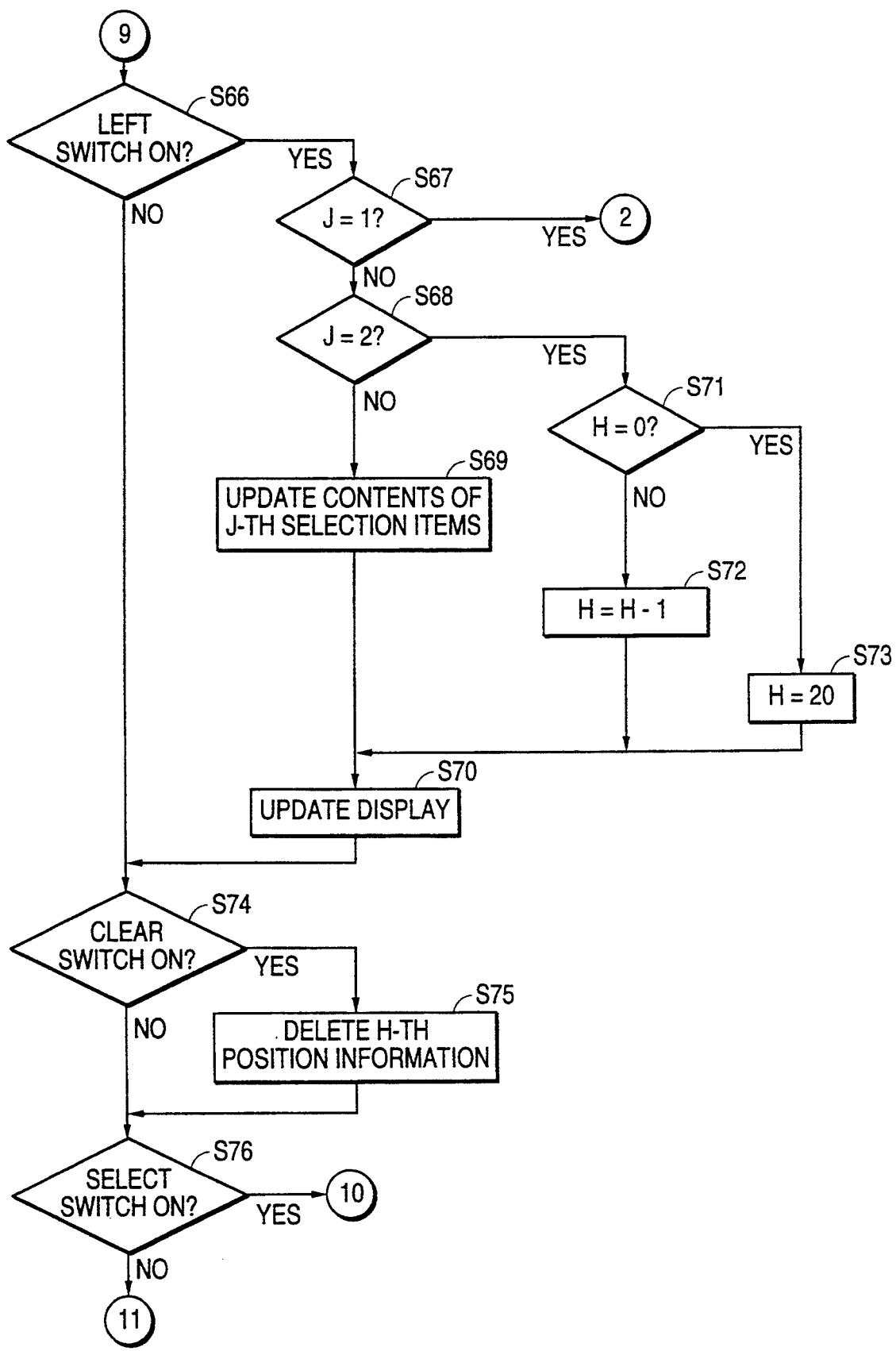
FIG. 16 is a further control flow chart in accordance with the principles of the present invention.

Referring now to FIG. 16, central processing section 11 subsequently judges whether LEFT switch 165 has been turned on (S66), and if not, advances the control sequence to processing at S74. When LEFT switch 165 has been turned on, central processing section 11 judges whether variable J is equal to 1 (S67). If so, control advances to the processing at S7 described above, but if variable J is not equal to 1, central processing section 11 judges whether variable J is equal to 2 (S68). When variable J has any other value than 2, central processing section 11 updates contents of the J-th selection items j 1 to j6 displayed in first selection region SL1 to those of a next candidate (S69) and then updates the display (S70), whereafter it advances the control sequence to processing at S74. In particular, central processing section 11 causes the numeral displayed at the spot number j2 to be changed to that corresponding to variable H and causes the positions of particular locations stored in spot information memory 24 which have the attribute selected at the item of the attribute j6 of a particular location and are included in the area j5 carded on the over wide page number j4 of the atlas of the atlas number j3, to be displayed in the form of symbols in the second selection region SL2.

On the other hand, when variable J is equal to 2 as a result of the judgment at S68, central processing section 11 judges whether variable H is equal to 0 (S71). When variable H is not equal to 0, it decrements variable H by 1 (S72) and then advances the control sequence to the processing at S70 described above, but when variable H is equal to 0, central processing section 11 sets variable H to 20 (S73) and then advances the control sequence to the processing at S70 described above.

Thereafter, central processing section 11 judges whether clear switch 168 has been turned on (S74), and if so, it deletes the position information of the H-th current location or destination from position information memory 12 (S75). On the other hand, when clear switch 168 has not been turned on, central processing section 11 judges whether select switch 161 has been turned on (S76), and if not, advances the control sequence to processing at S84 (FIG. 18). When select switch 161 has been turned on, control advances to S77 (FIG. 17), which causes the display of one of the particular locations in the second selection region SL2 to be displayed blinking.

Figure 17:
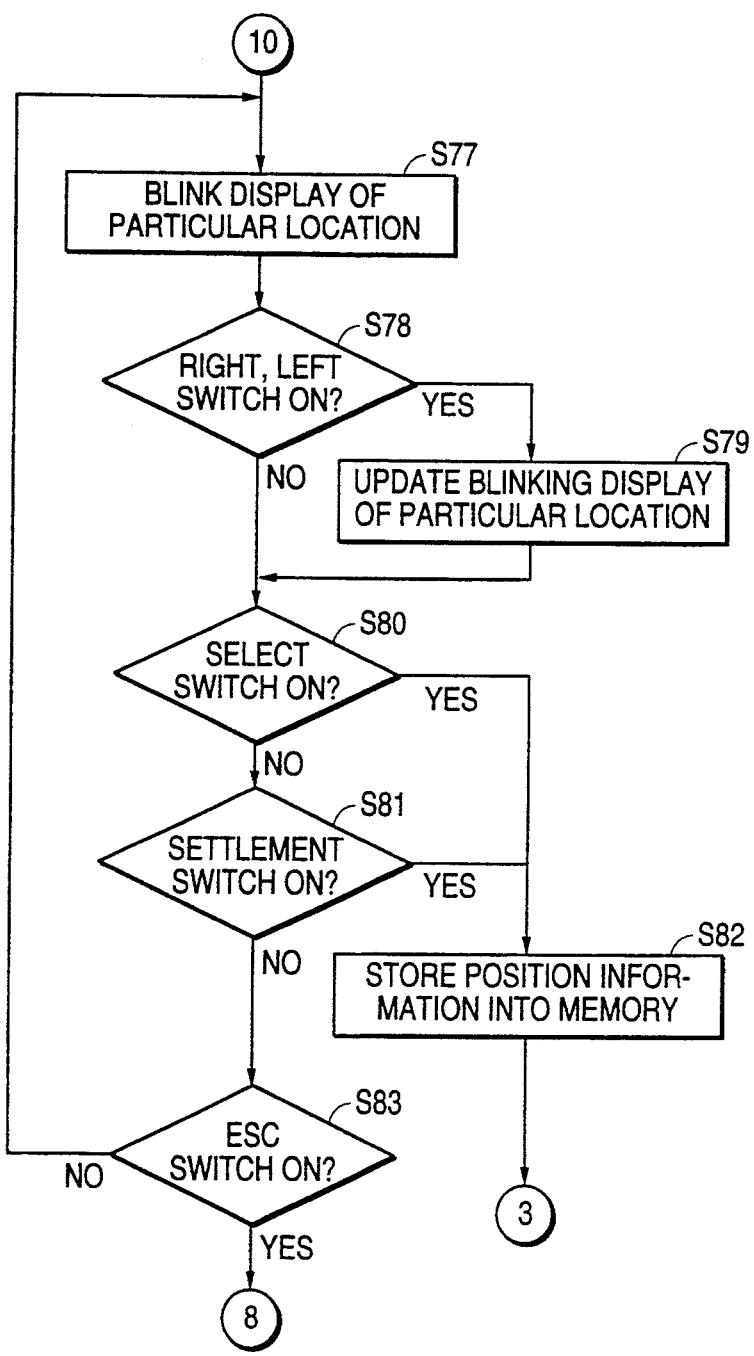
FIG. 17 is a further control flow chart in accordance with the principles of the present invention.
Figure 18:
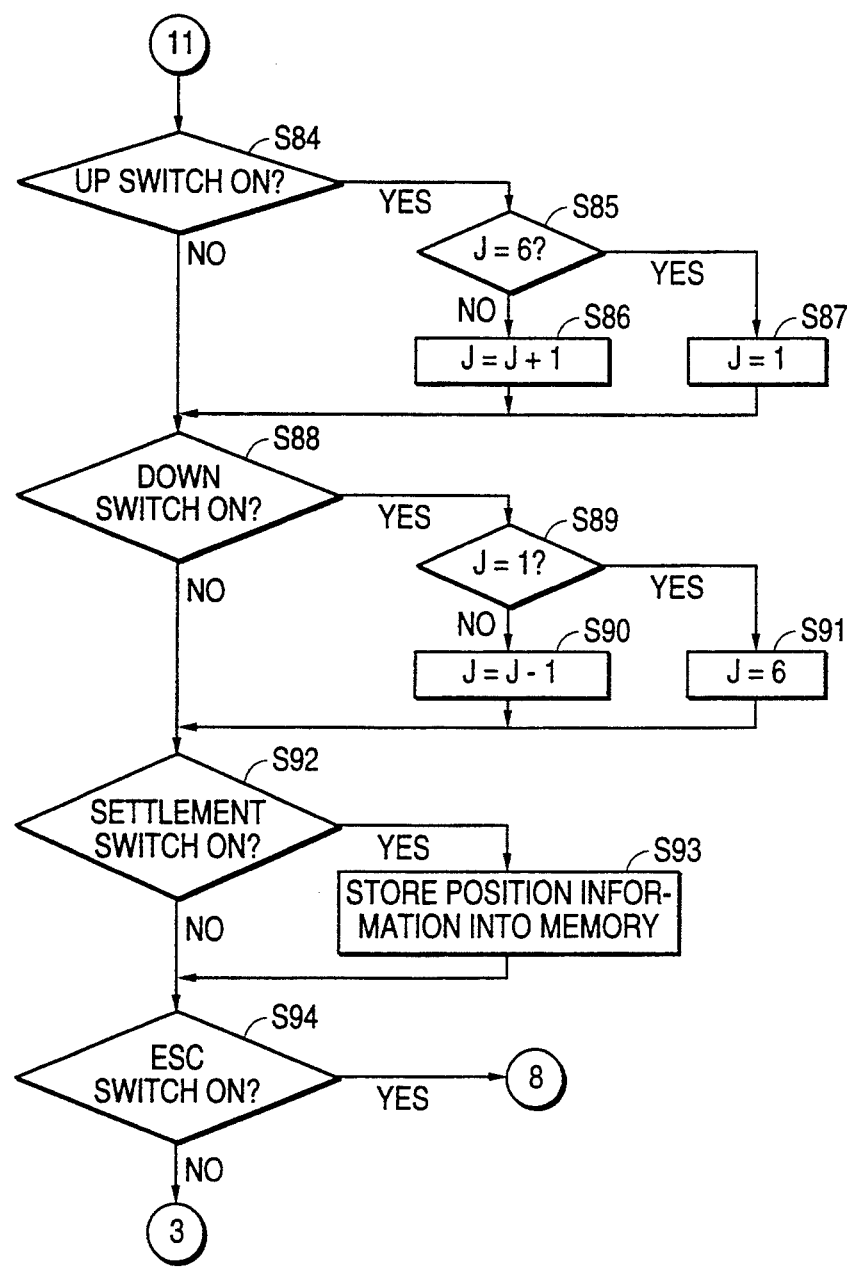
FIG. 18 is a further control flow chart in accordance with the principles of the present invention.

Continuing with reference to FIG. 17, a judgment is made whether RIGHT or LEFT switch 164 or 165 has been turned on (S78). When RIGHT or LEFT switch 164 or 165 has been turned on, central processing section 11 updates the particular location of an object for inputting and causes another particular location of a next candidate or a preceding candidate to be displayed blinking (S79).

Subsequently, central processing section 11 judges whether select switch 161 has been turned on (S80), and if so, advances the control sequence to processing at S82. When select switch 161 has not been turned on, central processing section 11 judges whether settlement switch 167 has been turned on (S81). When settlement switch 167 has been turned on, central processing section 11 stores the position information of the particular location which is displayed blinking as position information of the H-th current location or destination into the position information memory 12 (S82), whereafter it advances to the processing at S54 described above. If settlement switch 167 has not been mined on, central processing section 11 judges whether ESC switch 166 has been mined on (S83), and if so, advances the control sequence to the processing at S1 described hereinabove. If ESC switch 166 has not been turned on, central processing section 11 advances the control sequence to the processing at S77 described above.

Referring again to FIG. 16, when select switch 161 has not been turned on at S76 described above, central processing section I 1 judges whether LIP switch 162 has been turned on (S84, see FIG. 18), and if not, advances the control sequence to processing at S88. When UP switch 162 has been turned on, central processing section 11 judges whether variable J is equal to 6 (S85). When variable J has any other value than 6, central processing section 11 increments variable J by 1 (S86), but when variable J is equal to 6, it sets variable J to 1

(S87) and then judges whether DOWN switch 163 has been turned on (S88). When the DOWN switch 163 has not been turned on, central processing section 11 advances the control sequence to processing at S92, but when DOWN switch 163 has been turned on, it judges whether variable J is equal to 1 (S89). When variable J has any other value than 1, central processing section 11 decrements variable J by 1 (S90), but when variable J is equal to 1, it sets variable J to 6 (S91) and then judges whether settlement switch 167 has been mined on (S92).

When settlement switch 167 has been turned on, central processing section 11 stores the position information of the H-th current location or destination into the position information memory 12 (S93). On the other hand, when settlement switch 167 has not been mined on, central processing section 11 judges whether ESC switch 166 has been mined on (S94), and if so, advances the control sequence to the processing at S 1 described hereinabove. If ESC switch 166 has not been turned on, central processing section 11 advances the control sequence to the processing at S54 described hereinabove in reference to FIG. 15.

Figure 19:
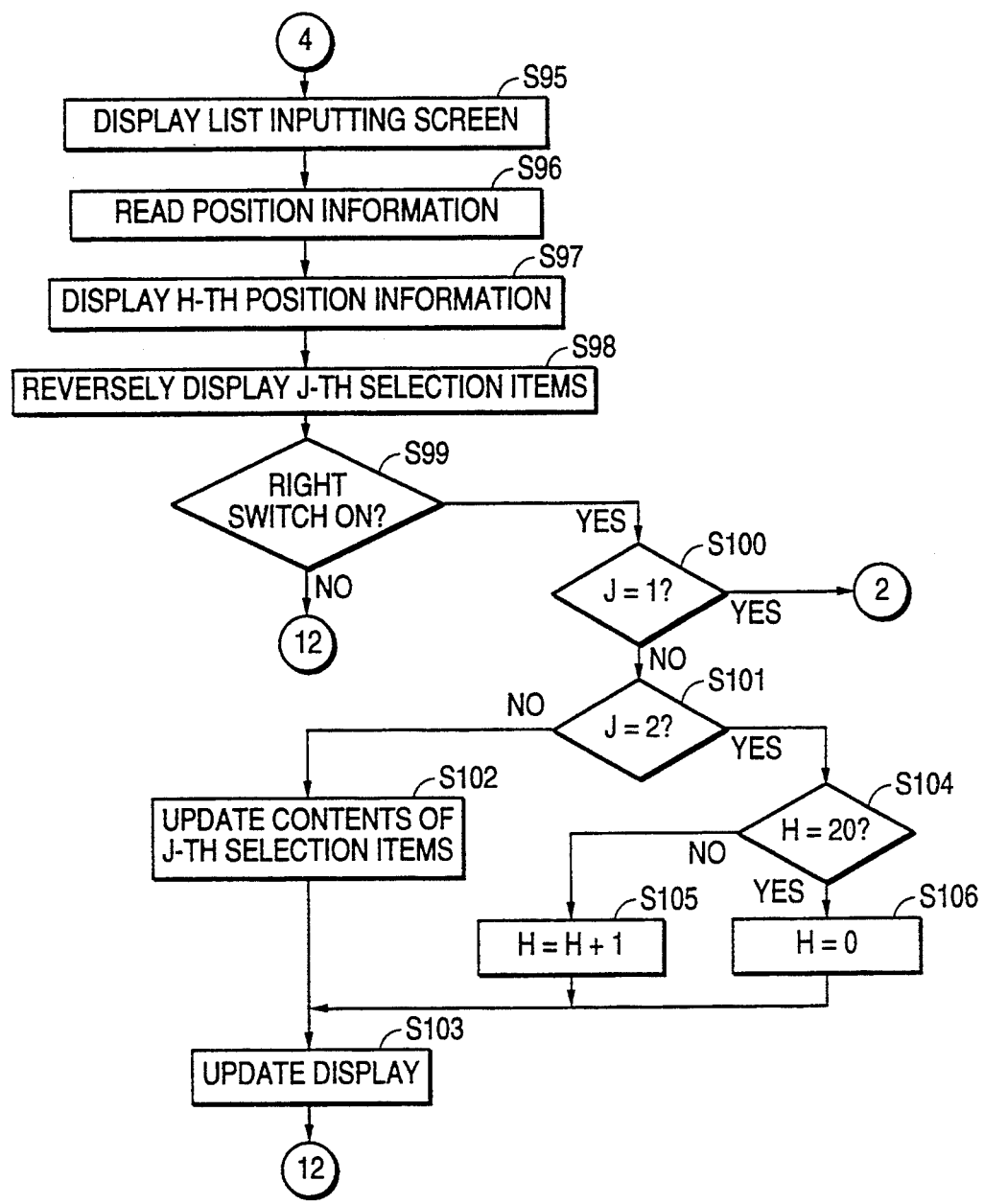
FIG. 19 is a further control flow chart in accordance with the principles of the present invention.

When variable J is equal to 1 as a result of the judgment at S18 or S59 described hereinabove, referring now to FIG. 19, central processing section 11 causes list inputting screen IN3 of FIG. 9 to be displayed (S95) and then reads out data of the position information stored in position information memory 12 (S96), whereafter it causes the position information of the H-th current location or destination to be displayed in the second selection region SL2 (S97). Then, central processing section 11 causes the J-th selection items j 1 to j6, which are displayed in the first selection region SL1, to be displayed with inverse video (S98). Thereafters central processing section 11 judges whether RIGHT switch 164 has been turned on (S99), and if not, advances the control sequence to processing at S107 (see FIG. 20).

Figure 20:
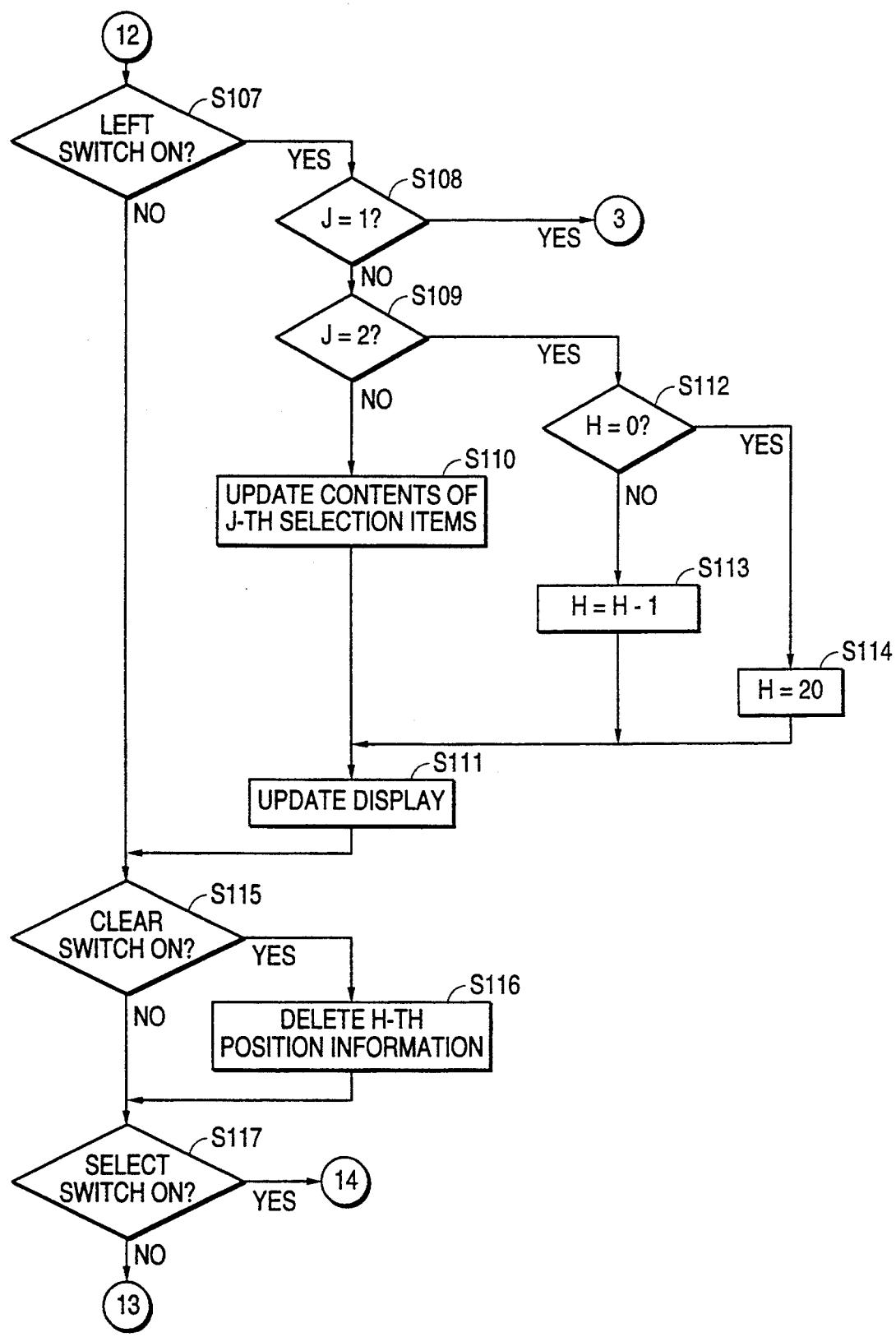
FIG. 20 is a further control flow chart in accordance with the principles of the present invention.

If RIGHT switch 164 has been turned on, central processing section 11 judges whether variable J is equal to 1 (S100). When variable J is equal to 1, central processing section 11 advances the control sequence to the processing at S7 described hereinabove (FIG. 12), but otherwise judges whether variable J is equal to 2 (S101). When variable J has any other value than 2, central processing section 11 updates the contents of the J-th selection items j1 to j6 displayed in the first selection region SL1 to those of a preceding candidate (S102) and then updates the display (S103), whereafter it advances the control sequence to processing at S107 (FIG. 20). In particular, central processing section 11 causes the numeral display at spot number j2 to be changed to that corresponding to variable H and causes the names of particular locations stored in spot information memory 24 which have the attribute selected at the item of the attribute j6 of a particular location and are included in the area j5 carried on the over wide page number j4 of the atlas of the atlas number j3, to be displayed in the form of a list in the second selection region SL2 as shown by way of example in FIG. 9.

On the other hand, when variable J is equal to 2, central processing section 11 judges whether variable H is equal to 20 (S104). If not, central processing section 11 increments variable H by 1 (S105) and then advances the control sequence to the processing at S103 described above, but when variable H is equal to 20, it sets variable H to 0 (S106) and then advances to the processing at S 103 described above.

Subsequently, referring now to FIG. 20, central processing section 11 judges whether LEFT switch 165 has been turned on (S107), and if not, advances the control sequence to processing at S115. If LEFT switch 165 has been turned on, central processing section 11 judges whether variable J is equal to 1 (S108). When variable J is equal to 1, central processing section 11 advances the control sequence to the processing at S54 described hereinabove, but otherwise judges whether variable J is equal to 2 (S109). When variable J has any other value than 2, central processing section 11 updates the contents of the J-th selection items j1 to j6 displayed in the first selection region SL1 to those of a next candidate (S110) and then updates the display (S111), whereafter it advances the control sequence to processing at S115. In particular, central processing section 11 causes the numeral display at the spot number j2 to be changed to that corresponding to variable H and causes the names of particular locations stored in spot information memory 24 which have the attribute selected at the item of the attribute j6 of a particular location and are included in the area j5 carried on the over wide page number j4 of the atlas of the atlas number j3 to be displayed in the form of a list in the second selection region SL2.

On the other hand, when variable J is equal to 2 as a result of the judgment at S109, central processing section 11 judges whether variable H is equal to 0 (S112). When variable H is not equal to 0, central processing section 11 decrements variable H by 1 (S113) and then advances to the processing at S111 described above. When variable H is equal to 0, central processing section 11 sets variable H to 20 (S114) and then advances the control sequence to the processing at S111 described above.

Figure 22:
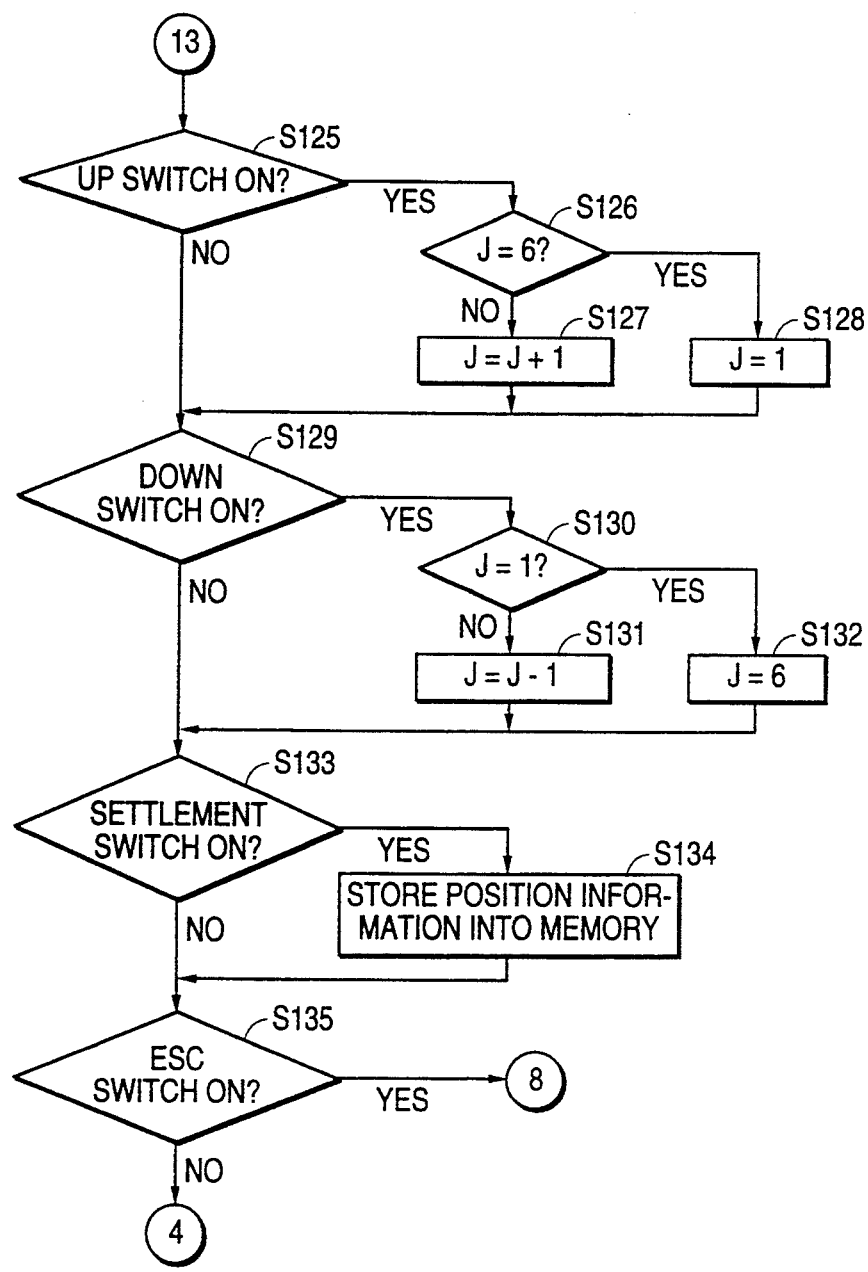
FIG. 22 is a further control flow chart in accordance with the principles of the present invention.

Thereafter, central processing section 11 judges whether clear switch 168 has been turned on (S 115), and if so, deletes the position information of the H-th current location or destination from the position information memory 12 (S116). On the other hand, when clear switch 168 has not been turned on, central processing section 11 judges whether select switch 161 has been turned on (S117), and if not, advances the control sequence to processing at S125 (FIG. 22).

Figure 21:
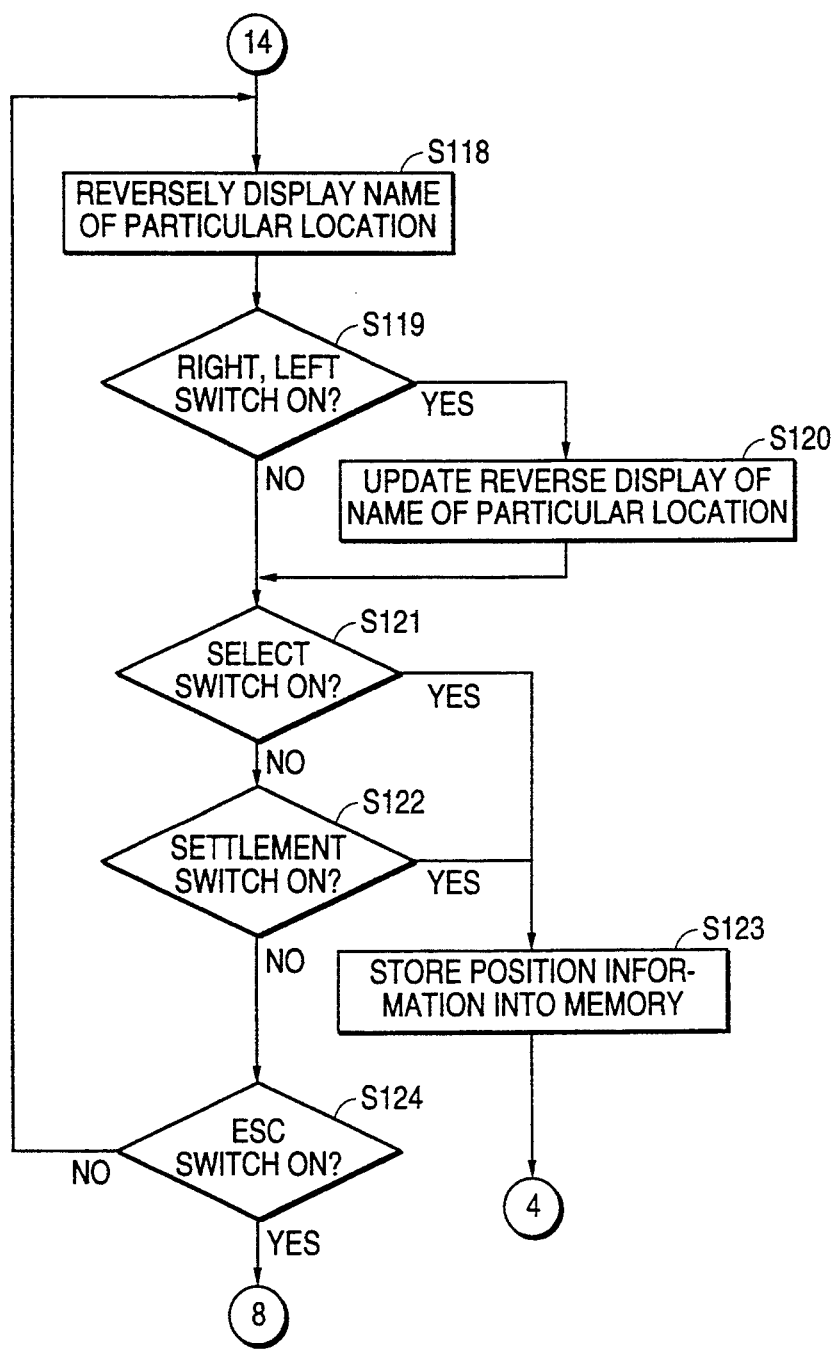
FIG. 21 is a further control flow chart in accordance with the principles of the present invention.

When select switch 161 has been mined on, referring now to FIG. 21, central processing section 11 causes the name of one of the particular locations in second selection region SL2 to be displayed with inverse video (S 118) and then judges whether RIGHT or LEFT switch 164 or 165 has been mined on (S119). If so, central processing section 11 updates the particular location of the object for inputting and causes a particular location of a next candidate or a preceding candidate to be displayed with inverse video (S120).

Subsequently, central processing section 11 judges whether select switch 161 has been turned on (S121), and, if so, advances the control sequence to processing at S123. If not, central processing section 11 judges whether settlement switch 167 has been turned on (S122). If so, central processing section 11 stores the position information of the particular location displayed with inverse video as position information of the H-th current location or destination into the position information memory 12 (S123), and then advances the control sequence to the processing at S95 described above. On the other hand, when settlement switch 167 has not been turned on, central processing section 11 judges whether ESC switch 166 has been turned on (S124), and, if so, advances the control sequence to the processing at S1 described hereinabove. If ESC switch 166 has not been turned on, central processing section 11 advances the control sequence to the processing at S118 described above.

When select switch 161 has not been turned on as a result of the judgment at SII7 (FIG. 20) described hereinabove, referring now to FIG. 22, central processing section 11 judges whether UP switch 162 has been turned on (S125), and if not, advances the control sequence to processing at S129. If UP switch 162 has been turned on, central processing section 11 judges whether variable J is equal to 6 (S126). When variable J has any other value than 6, central processing section 11 increments variable J by 1 (S127), but otherwise sets variable J to 1 (S128) and then judges whether DOWN switch 163 has been turned on (S129).

If DOWN switch 163 has not been turned on, central processing section 11 advances the control sequence to processing at S133. If DOWN switch 163 has been turned on, central processing section 11 judges whether variable J is equal to 1 (S130). When variable J has any other value than 1, central processing section 11 decrements variable J by 1 (S131), but when variable J is equal to 1, it sets variable J to 6 (S132) and then judges whether settlement switch 167 has been turned on (S133).

When settlement switch 167 has been turned on, central processing section 11 stores the position information of the H-th current location or destination into the position information memory 12 (S134). On the other hand, when settlement switch 167 has not been turned on, central processing section 11 judges whether ESC switch 166 has been turned on (S135). If so, it advances the control sequence to the processing at S1 described hereinabove, but otherwise advances the control sequence to the processing at S95 described above.

Figure 23:
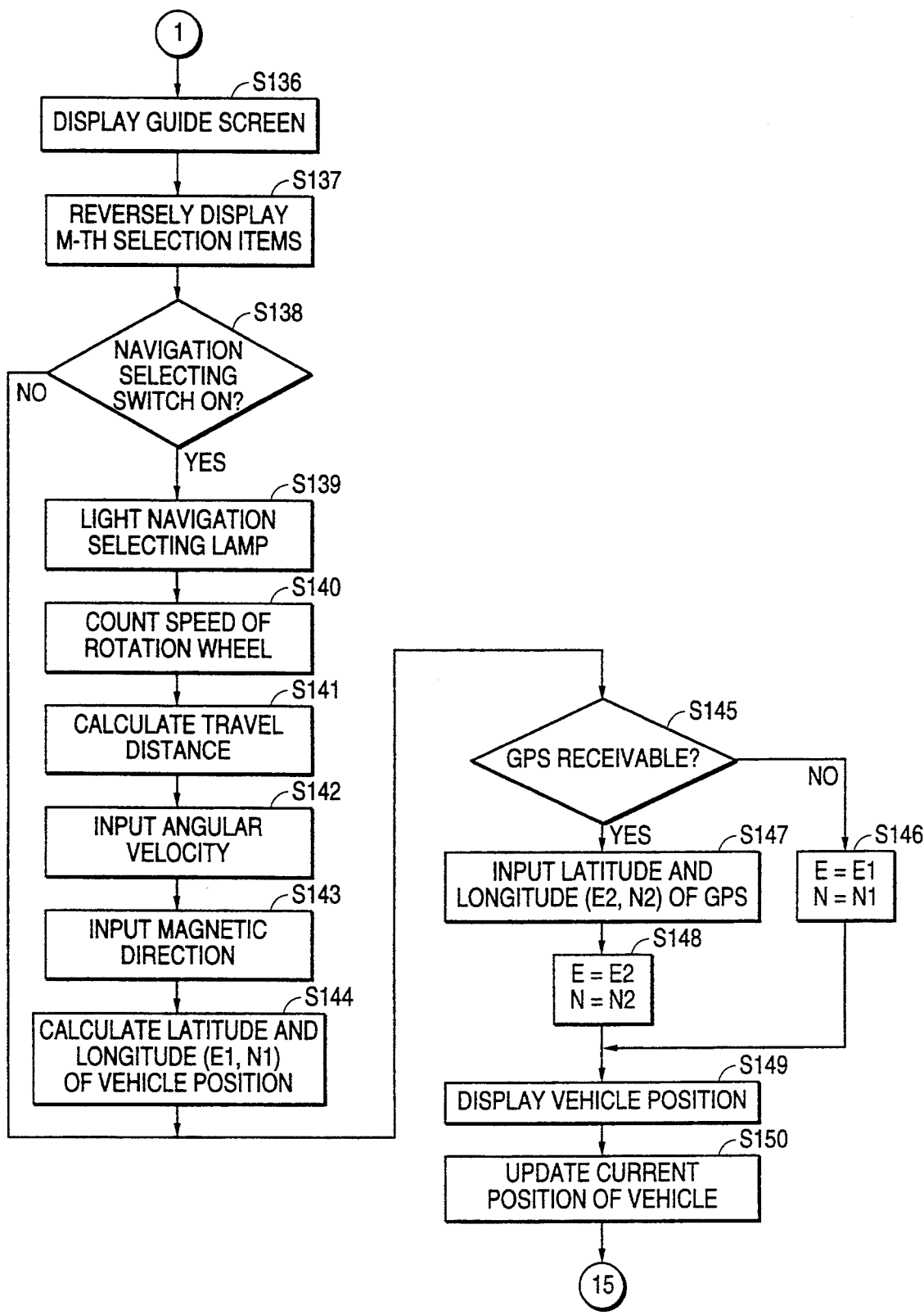
FIG. 23 is a further control flow chart in accordance with the principles of the present invention.

When the cursor is at item "GUIDE" as a result of the judgment at S6 described hereinabove, referring now to FIG. 23, central processing section 11 causes the current position of the vehicle, the position of a destination and so forth to be displayed in accordance with the position information stored in the memories and signals from the sensors. In particular, central processing section 11 causes guide screen DSP (FIG. 10) to be displayed (S136) and then causes the M-th selection items in the first selection region SL1 to be displayed with inverse video (S137). Thereafter, central processing section 11 judges whether navigation selecting switch 169 is in an on-state (S138). If not, central processing section 11 advances the control sequence to processing at S145.

On the other hand, when navigation selecting switch 169 is in an on-state, central processing section 11 causes the navigation selecting lamp to be tit (S139) and then counts the speed F of rotation of a wheel in response to pulses from the vehicle speed sensor 22 (S140), whereafter it calculates a travel distance L from the speed F of rotation (S141). Further, central processing section 11 inputs an angular velocity co from the angular velocity sensor 14 (S142) and then detects the advancing direction of the vehicle in accordance with a signal from the magnetic direction detector 25 (S143), whereafter it effects vector calculation from the distance L, the angular velocity ω and the advancing direction to calculate a longitude and a latitude (E1, N1) of the vehicle position (S144). Formulas for calculating a current latitude and longitude based on these factors are well known in the art and are not repeated here. The processing at S140 to S144 described above is performed repetitively after each predetermined interval of time, for example, after each 500 ms.

Thereafter, central processing section 11 judges whether GPS receiver 21 can receive a signal, that is, whether the receiving condition of radio waves by the GPS receiver 21 is good (S145), and when GPS receiver 21 cannot receive, central processing section 11 sets the longitude and the latitude (E1, N1) calculated at the processing at S 144 as the longitude and the latitude (E, N) of the current position of the vehicle (S146), and then advances the control sequence to processing at S149.

On the other hand, when GPS receiver 21 can receive, central processing section 11 inputs a longitude and a latitude (E2, N2) from the GPS receiver 21 (S147) and sets the longitude and the latitude (F2, N2) so received as the longitude and the latitude (E, N) of the current position of the vehicle (S148). The data of the longitude and the latitude (E, N) are kept for a predetermined period of time by central processing section 11.

Figure 10:
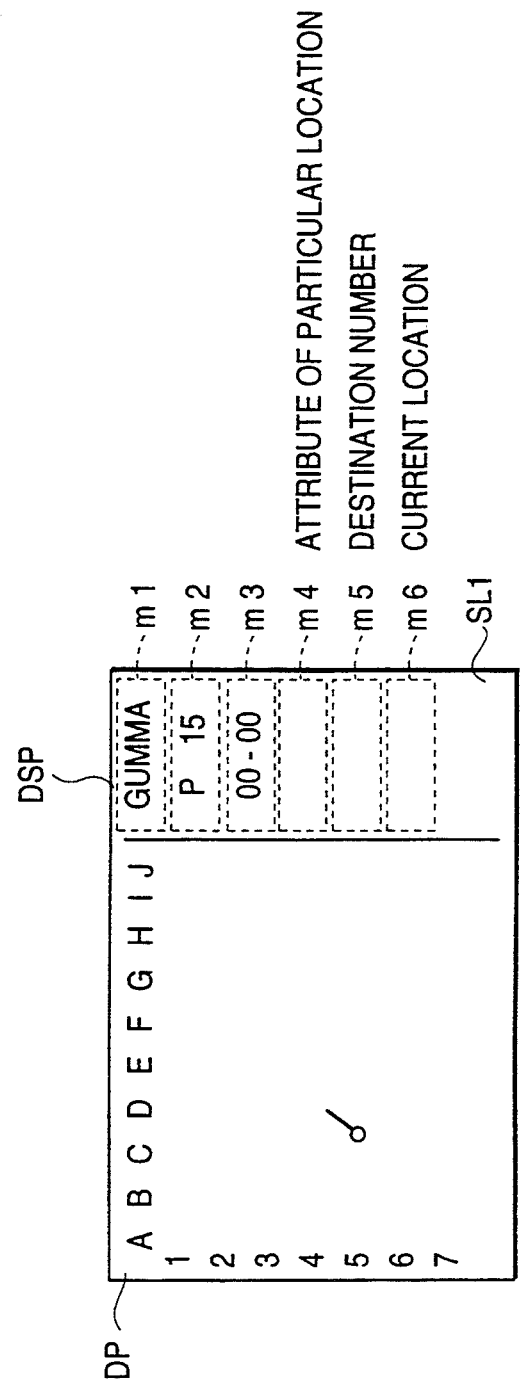
FIG. 10 is a view showing a further information inputting screen in accordance with the principles of the present invention.

Subsequently, central processing section 11 causes the current position of the vehicle to be displayed in the position display region DP of the guide screen DSP and causes the advancing direction of the vehicle to be displayed in terms of a vector (S149), as depicted in FIG. 10. Further, central processing section 11 updates the current position information of the vehicle stored in position information memory 12 in accordance with the calculation result (S150) and then judges whether UP switch 162 has been turned on (S151, FIG. 24).

When UP switch 162 has not been turned on, central processing section 11 advances the control sequence to processing at S155, but otherwise judges whether the value of variable M is equal to 6 (S152). When the value of variable M has any other value than 6, central processing section 11 increments the value of variable M by 1 (S153), but when the value of variable M is equal to 6, it sets 1 as the value of variable M (S154) and then judges whether the DOWN switch 163 has been turned on (S155).

Figure 24:
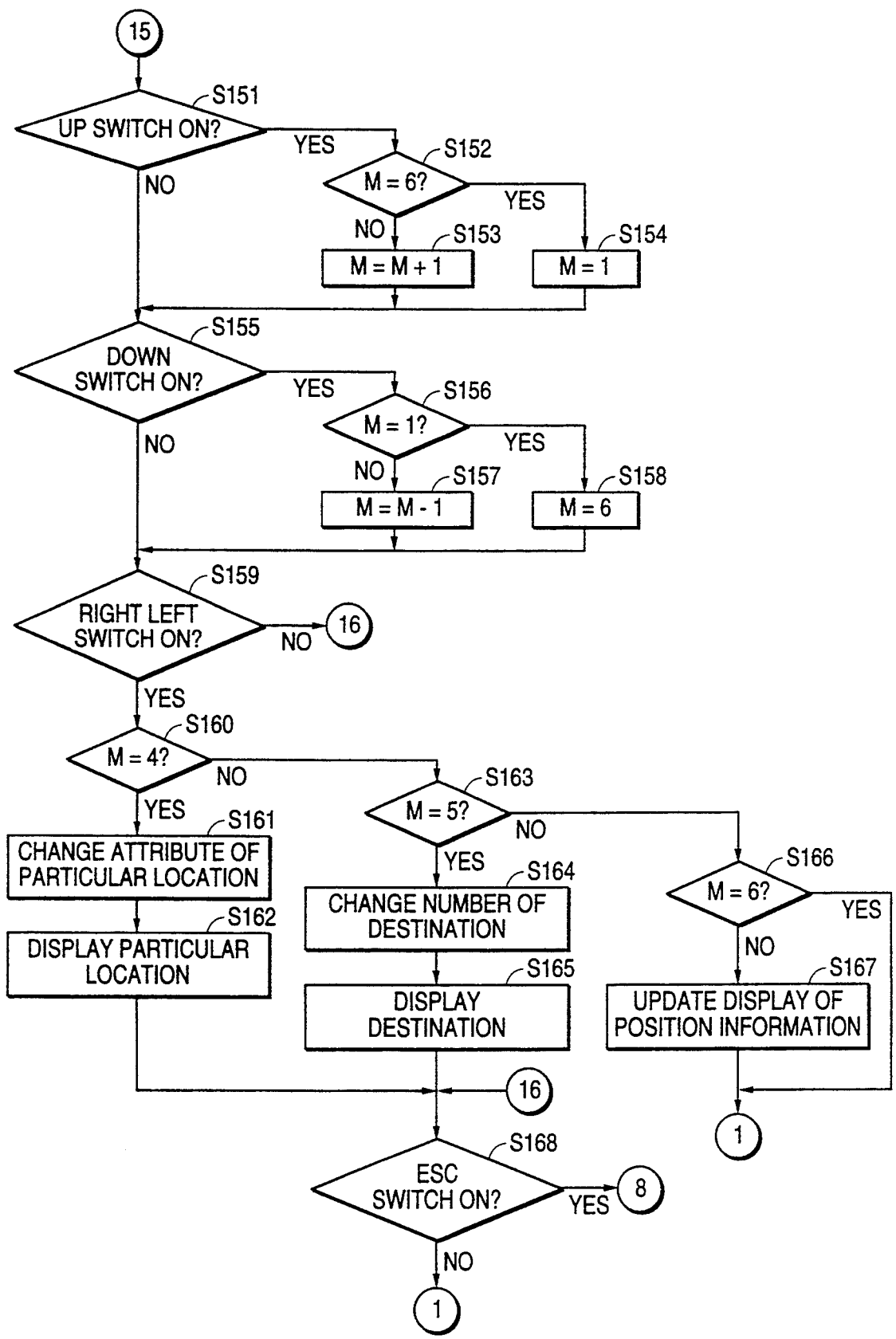
FIG. 24 is a further control flow chart in accordance with the principles of the present invention.

When DOWN switch 163 has not been turned on, central processing section 11 advances the control sequence to processing at S 159, but, otherwise, judges whether the value of variable M is equal to 1 (S156). When the value of variable M has any other value than 1, central processing section 11 decrements the value of variable M by 1 (S157). When the value of variable M is equal to 1, central processing section 11 sets the value of variable M to 6 (S158) and then judges whether RIGHT or LEFT switch 164 or 165 has been turned on (S 159). If not, central processing section 11 advances the control sequence to processing at S 168 (FIG. 24 at bottom).

On the other hand, when either RIGHT or LEFT switch 164 or 165 has been turned on, central processing section 11 judges whether the value of variable M is equal to 4 (S160). This tests whether the cursor is at the item of attribute m4 of a particular location. If so, central processing section 11 updates the attribute m4 of a particular location to that of a preceding candidate or a next candidate (S161) and causes the positions of particular locations, which correspond to the attribute m4 and are present in the area m3 of the page number m2 of the atlas name m 1, to be displayed on the guide screen DP (S 162). Thereafter, central processing section 11 advances the control sequence to processing at S168.

When the value of variable M is not equal to 4 at S160 described above, central processing section 11 judges whether the value of variable M is equal to 5 (S163). This tests whether the cursor is at the item of number m5 of a destination. If so, central processing section 11 updates the number m5 of a destination to that of a preceding candidate or a next candidate (S 164) and then causes the position of the destination corresponding to the number to be displayed on the guide screen DP (S165), whereafter control advances to processing at S168. In this instance, when the position of the designated destination is outside the area displayed on the guide screen DP, another area in which the destination is present is displayed on the guide screen DP, and the atlas name m 1, the page number m2 and the area m3 of the selection items are displayed in a corresponding relationship.

When the value of variable M is not equal to 5 at S163 described hereinabove, central processing section 11 judges whether the value of variable M is equal to 6 (S166). This tests whether the cursor is at the item of current location m6. If so, central processing section 11 advances the control sequence to the processing at S136 described hereinabove so that a large area ER including the current location is displayed on the guide screen DP and the current location and the advancing direction of the vehicle are displayed in terms of a vector and further the display of the selection items ml to m6 is changed correspondingly.

When the value of variable M assumes any other value than 6, central processing section 11 causes an area corresponding to selected contents of the selection items m1 to m6 to be displayed and causes the position information in the area to be displayed (S167).

When RIGHT or LEFT switch 164 or 165 has not been turned on at S159 described above, central processing section 11 judges whether ESC switch 166 has been turned on (S168), and, if so, advances the control sequence to the processing at S 1 described hereinabove. If ESC switch 166 has not been turned on, central processing section 11 advances the control sequence to the processing at S136 described above.

As described above, according to the present embodiment, since position information of a current location and a destination can be entered with direct inputting screen IN1 and position information of a destination and so forth can be roughly inputted with the image inputting screen IN2 or the list inputting screen IN3 by selecting the position of a particular location displayed on the image of the atlas or by selecting the name of a particular location displayed in the list, even when a beginner unfamiliar with the operation of the apparatus enters position information of a destination or the like, he or she can do so quickly and without confusion. Further, with image inputting screen IN2, since the position of a particular location is displayed in a superimposed relationship with an image of an atlas, the position of the particular location can be recognized readily. Since a particular location can be selected arbitrarily in accordance with an attribute and only particular locations which are present in a designated area are so selected, the time required for entering information can be further reduced.

While in the present embodiment areas on an atlas are described having a square shape having a side of 2.5 km or 500 m, the position and travel route of a vehicle can be recognized sufficiently in the suburbs if an area having a side of 2.5 km is viewed on a map. On the other hand, in an urban area, if an area having a side of 500 m is made correspond to a map and situations in the surroundings such as the magnitude of the road or a road-sign are observed, then the position and a travel route of the vehicle can be recognized readily.

Accordingly, information sufficient for recognition of the position and a travel mute of the vehicle can be obtained by the representation of a position using an area described above. Further, since a storage medium such as an expensive CD-ROM is not employed, the cost is reduced significantly compared with conventional vehicle travel guide apparatus.

It is to be noted that the ranges of areas and so forth in the present embodiment are a mere example, and the present invention is not limited to this. Furthermore, while in the present embodiment an atlas and a memory card 24 are provided for each of the urban and rural prefectures, map information for the entire nation may be stored in a single memory card 24. It is possible to accept data of such road-vehicle communication systems as a sign post or a beacon and display the position on a map rather than using a G.P.S. receiver.

As thus described, since only a designated result of a retrieval by the spot information retrieving means is stored as position information of a destination or the like into the position information storage means, even a beginner who is not familiar with detailed operation of the apparatus is able to enter position information such as a destination easily in a short time without confusion.

In addition to the above described benefit, the cost of the apparatus body can be reduced since the spot information storage means can be constructed from an IC card which is removable from the apparatus body and can be exchanged as needed to correspond to a particular paper map.

Further, the position of a destination or the like can be recognized readily since an over wide image of the paper map is displayed and the result of the retrieval or the inputted point is displayed in a superimposed relationship with the image by the display means.

We claim:

1. An apparatus for inputting and storing a position of a vehicle for use in a vehicle navigation system, the apparatus comprising:

map information storage means for storing atlas information that corresponds to areas of an associated paper atlas;

spot information storage means for storing spot information corresponding to predetermined points of interest within areas of the associated paper atlas and linked to said atlas information, said spot information including an attribute of each predetermined point of interest;

designating means for designating a specific area of the associated paper atlas and for designating a specific attribute;

means for retrieving from said spot information storage means and displaying spot information which corresponds to points of interest within said specific area and which shares said specific attribute;

selecting means for selecting one of the points of interest corresponding to displayed spot information; and position information storage means for storing the position of the vehicle according to the one point of interest selected by said selecting means.

2. The apparatus of claim 1, wherein the position of the vehicle is a current position of the vehicle.

3. The apparatus of claim 1, wherein the position of the vehicle is a destination position of the vehicle.

4. The apparatus of claim 3, further comprising:
 position detecting means for detecting the current position of the vehicle;
 calculating means for calculating travel guide information according to the current position of the vehicle detected by the position detecting means, the destination position of the vehicle stored in the position information storage means, and the atlas information stored in the map information storage means; and
 display means for displaying a result according to the travel guide information calculated by said calculating means.

5. The apparatus of claim 1, wherein said atlas information includes an atlas name of the associated paper atlas.

6. The apparatus of claim 1, wherein
 the associated paper atlas is divided into a plurality of large areas each having a large area number, a page number, a north latitude reference point and an east longitude reference point, wherein each large area is further divided into a plurality of small areas each having a longitudinal unit length and a latitudinal unit length;
 said atlas information stored by said map information storage means includes said large area number, said page number, said north latitude reference point and said east longitude reference point of each large area of the associated paper atlas and includes said longitudinal unit length and said latitudinal unit length of said small areas of the associated paper atlas; and
 said spot information stored by said spot information storage means includes for each predetermined point of interest a north latitude location, an east longitude location, and the page number of the large area of the associated paper atlas wherein the predetermined point of interest is located.

7. The apparatus of claim 6, wherein said spot information stored by said spot information storage means includes, for each predetermined point of interest, the small area wherein the predetermined point of interest is located.

8. The apparatus of claim 1, wherein said spot information storage means comprises an IC card which is removable from the body of the apparatus.

9. The apparatus of claim 8, further comprising means for displaying second atlas information which corresponds to areas of the associated paper atlas superimposed by displayed spot information.

10. The apparatus of claim 1, further comprising means for displaying second atlas information which corresponds to areas of the associated paper atlas superimposed by displayed spot information.

* * * * *